(12) United States Patent
Sebastian et al.

(10) Patent No.: US 10,187,436 B2
(45) Date of Patent: *Jan. 22, 2019

(54) CONTENT SET BASED DELTACASTING

(71) Applicant: ViaSat Inc., Carlsbad, CA (US)

(72) Inventors: William B. Sebastian, E. Falmouth, MA (US); Peter Lepeska, Boston, MA (US)

(73) Assignee: ViaSat, Inc., Carlsbad, CA (US)

( * ) Notice: Subject to any disclaimer, the term of this patent is extended or adjusted under 35 U.S.C. 154(b) by 936 days.

This patent is subject to a terminal disclaimer.

(21) Appl. No.: 13/919,888

(22) Filed: Jun. 17, 2013

(65) Prior Publication Data

US 2013/0282796 A1    Oct. 24, 2013

Related U.S. Application Data

(62) Division of application No. 12/685,729, filed on Jan. 12, 2010, now Pat. No. 8,489,672.

(Continued)

(51) Int. Cl.
    *G06F 15/16*    (2006.01)
    *H04L 29/06*    (2006.01)
    (Continued)

(52) U.S. Cl.
    CPC ...... *H04L 65/4076* (2013.01); *H04L 12/1859* (2013.01); *H04L 12/1863* (2013.01);
    (Continued)

(58) Field of Classification Search
    CPC . H04L 65/4076; H04L 65/10; H04L 12/1859; H04L 12/1863; H04L 12/1881;
    (Continued)

(56) References Cited

U.S. PATENT DOCUMENTS 5,408,470 A    4/1995   Rothrock
5,740,367 A    4/1998   Spilo
               (Continued)

FOREIGN PATENT DOCUMENTS

EP              2536065 A2    12/2012
WO    WO-2001/061886 A2       8/2001
               (Continued)

OTHER PUBLICATIONS

Final Office Action mailed in U.S. Appl. No. 14/070,977 dated Feb. 23, 2016, 28 pgs.
(Continued)

*Primary Examiner* — Dhariya A Patel
(74) *Attorney, Agent, or Firm* — Marsh Fischmann & Breyfogle LLP

(57) ABSTRACT

Methods, apparatuses, and systems are provided for improving utilization of the satellite communications system through various "deltacasting" techniques for handling content sets (e.g., feeds or websites). Embodiments operate in a client-server context, including a server optimizer, a client optimizer, and, in some embodiments, a pre-positioning client. Within this client-server context, content sets are multicast (e.g., anticipatorily pre-positioned in a local dictionary) to end users of the communications system and are handled at the content set level, according to set-level metadata and/or user preferences. In some embodiments, when locally stored information from the content sets is requested by a user, deltacasting techniques are used to generate fingerprints for use in identifying and exploit multicasting and/or other opportunities for increased utilization of links of the communications system.

17 Claims, 7 Drawing Sheets

Related U.S. Application Data

(60) Provisional application No. 61/170,359, filed on Apr. 17, 2009, provisional application No. 61/144,363, filed on Jan. 13, 2009.

(51) Int. Cl.
| | | |
|---|---|---|
| *H04L 12/18* | (2006.01) | |
| *H04L 12/911* | (2013.01) | |
| *H04L 29/08* | (2006.01) | |
| *H04L 12/743* | (2013.01) | |

(52) U.S. Cl.
CPC ...... *H04L 12/1881* (2013.01); *H04L 12/1886* (2013.01); *H04L 45/7453* (2013.01); *H04L 47/70* (2013.01); *H04L 65/60* (2013.01); *H04L 67/10* (2013.01); *H04L 67/42* (2013.01); *H04L 69/04* (2013.01); *H04L 69/22* (2013.01)

(58) Field of Classification Search
CPC . H04L 12/1886; H04L 47/70; H04L 45/7453; H04L 67/10; H04L 67/42; H04L 69/04; H04L 69/22
See application file for complete search history.

(56) References Cited

U.S. PATENT DOCUMENTS

| | | | |
|---|---|---|---|
| 5,870,754 A | | 2/1999 | Dimitrova et al. |
| 5,905,981 A | | 5/1999 | Lawler |
| 6,178,461 B1 | | 1/2001 | Chan et al. |
| 6,182,133 B1 * | | 1/2001 | Horvitz ............. G06F 17/30902 707/999.008 |
| 6,339,787 B1 | | 1/2002 | Yohe et al. |
| 6,701,316 B1 | | 3/2004 | Li et al. |
| 6,757,283 B1 * | | 6/2004 | Yamanaka ............. H04L 29/06 370/390 |
| 6,879,808 B1 | | 4/2005 | Nations et al. |
| 7,023,818 B1 * | | 4/2006 | Elliott ................. H04L 63/0428 370/328 |
| 7,124,305 B2 | | 10/2006 | Margolus et al. |
| 7,130,890 B1 | | 10/2006 | Kumar et al. |
| 7,143,251 B1 * | | 11/2006 | Patterson .......... G06F 17/30153 711/162 |
| 7,340,510 B1 | | 3/2008 | Liskov et al. |
| 7,359,956 B2 | | 4/2008 | Kanai et al. |
| 7,376,150 B2 | | 5/2008 | Vedantham et al. |
| 7,430,331 B2 | | 9/2008 | Singh |
| 7,509,667 B1 | | 3/2009 | Cook |
| 7,636,767 B2 | | 12/2009 | Lev-Ran et al. |
| 7,680,897 B1 | | 3/2010 | Carter et al. |
| 7,681,032 B2 | | 3/2010 | Peled et al. |
| 7,716,367 B1 | | 5/2010 | Leighton et al. |
| 7,778,438 B2 | | 8/2010 | Malone |
| 7,814,149 B1 | | 10/2010 | Stringham |
| 7,836,177 B2 | | 11/2010 | Kasriel et al. |
| 7,917,531 B2 | | 3/2011 | Sakurai et al. |
| 7,941,409 B2 | | 5/2011 | Mimatsu |
| 7,953,881 B1 | | 5/2011 | Vadlakonda et al. |
| 8,010,705 B1 | | 8/2011 | Sebastian et al. |
| 8,041,677 B2 | | 10/2011 | Sumner et al. |
| 8,055,616 B2 | | 11/2011 | Johnston et al. |
| 8,082,228 B2 | | 12/2011 | Mu |
| 8,151,004 B1 | | 4/2012 | Ufimtsev et al. |
| 8,230,059 B1 | | 7/2012 | Santos et al. |
| 8,230,461 B1 | | 7/2012 | Ledermann et al. |
| 8,284,773 B1 | | 10/2012 | Woleben et al. |
| 8,477,635 B2 | | 7/2013 | Sebastian et al. |
| 8,489,672 B2 | | 7/2013 | Sebastian et al. |
| 8,489,673 B2 | | 7/2013 | Sebastian et al. |
| 8,639,744 B2 | | 1/2014 | Sebastian |
| 8,671,223 B1 | | 3/2014 | Sebastian et al. |
| 8,775,503 B2 | | 7/2014 | Sebastian |
| 8,842,553 B2 | | 9/2014 | Sebastian et al. |
| 8,897,302 B2 | | 11/2014 | Sebastian |
| 9,137,568 B2 * | | 9/2015 | Sinha ..................... G06T 1/0021 |
| 9,172,748 B2 | | 10/2015 | Sebastian |
| 9,363,308 B2 | | 6/2016 | Sebastian et al. |
| 9,369,516 B2 | | 6/2016 | Sebastian et al. |
| 9,407,355 B1 | | 8/2016 | Lerner |
| 9,762,635 B2 | | 9/2017 | Sebastian et al. |
| 9,935,740 B2 | | 4/2018 | Sebastian |
| 2001/0016836 A1 | | 8/2001 | Boccon-Gibod et al. |
| 2001/0043600 A1 | | 11/2001 | Chatterjee et al. |
| 2002/0006116 A1 | | 1/2002 | Burkhart |
| 2002/0026478 A1 | | 2/2002 | Rodgers et al. |
| 2002/0129168 A1 | | 9/2002 | Kanai et al. |
| 2002/0154887 A1 * | | 10/2002 | Lu ..................... H04N 1/2221 386/261 |
| 2002/0188735 A1 | | 12/2002 | Needham et al. |
| 2002/0194473 A1 | | 12/2002 | Pope et al. |
| 2003/0018581 A1 | | 1/2003 | Bratton et al. |
| 2003/0018878 A1 | | 1/2003 | Dorward et al. |
| 2003/0050966 A1 | | 3/2003 | Dutta et al. |
| 2004/0081199 A1 | | 4/2004 | Lopez et al. |
| 2004/0205071 A1 | | 10/2004 | Uesugi et al. |
| 2005/0010870 A1 | | 1/2005 | Gu et al. |
| 2005/0033747 A1 | | 2/2005 | Wittkotter |
| 2005/0131903 A1 | | 6/2005 | Margolus et al. |
| 2005/0249231 A1 | | 11/2005 | Khan |
| 2005/0289629 A1 | | 12/2005 | Nadarajah |
| 2006/0064383 A1 | | 3/2006 | Marking |
| 2006/0161625 A1 * | | 7/2006 | Norp ..................... H04L 12/18 709/206 |
| 2006/0167969 A1 | | 7/2006 | Andreev et al. |
| 2006/0184960 A1 | | 8/2006 | Horton et al. |
| 2006/0253444 A1 | | 11/2006 | O'Toole et al. |
| 2006/0277257 A1 | | 12/2006 | Kromann et al. |
| 2006/0288072 A1 | | 12/2006 | Knapp et al. |
| 2007/0033408 A1 | | 2/2007 | Morten |
| 2007/0101074 A1 | | 5/2007 | Patterson |
| 2007/0111713 A1 | | 5/2007 | Silverbrook et al. |
| 2007/0116151 A1 | | 5/2007 | Thesling |
| 2007/0133554 A1 | | 6/2007 | Ederer et al. |
| 2007/0143484 A1 | | 6/2007 | Drouet et al. |
| 2007/0174246 A1 | | 7/2007 | Sigurdsson et al. |
| 2007/0220303 A1 | | 9/2007 | Kimura et al. |
| 2007/0256021 A1 | | 11/2007 | Prager et al. |
| 2007/0288518 A1 | | 12/2007 | Crigler et al. |
| 2008/0005086 A1 | | 1/2008 | Moore |
| 2008/0016201 A1 | | 1/2008 | Thompson |
| 2008/0022135 A1 | | 1/2008 | Gaya |
| 2008/0066182 A1 | | 3/2008 | Hickmott et al. |
| 2008/0144713 A1 | | 6/2008 | Kimmich et al. |
| 2008/0155614 A1 | | 6/2008 | Cooper et al. |
| 2008/0175239 A1 | | 7/2008 | Sistanizadeh et al. |
| 2008/0205396 A1 | | 8/2008 | Dakshinamoorthy et al. |
| 2008/0235391 A1 | | 9/2008 | Painter et al. |
| 2008/0235739 A1 | | 9/2008 | Coebergh Van Den Braak |
| 2008/0256138 A1 | | 10/2008 | Sim-Tang |
| 2008/0263130 A1 | | 10/2008 | Michalowitz et al. |
| 2008/0320151 A1 | | 12/2008 | McCanne et al. |
| 2009/0037393 A1 | | 2/2009 | Fredricksen et al. |
| 2009/0049469 A1 | | 2/2009 | Small et al. |
| 2009/0055471 A1 | | 2/2009 | Kozat et al. |
| 2009/0055862 A1 | | 2/2009 | Knoller et al. |
| 2009/0060086 A1 | | 3/2009 | Kimmich et al. |
| 2009/0158318 A1 | | 6/2009 | Levy |
| 2009/0168795 A1 | | 7/2009 | Segel |
| 2009/0187673 A1 | | 7/2009 | Ramjee et al. |
| 2009/0196296 A1 | | 8/2009 | Vachuska |
| 2009/0234809 A1 | | 9/2009 | Bluger et al. |
| 2009/0265516 A1 | | 10/2009 | Prabhu et al. |
| 2009/0271528 A1 | | 10/2009 | Gurevich et al. |
| 2009/0313329 A1 | | 12/2009 | Agrawal et al. |
| 2009/0327505 A1 | | 12/2009 | Rao et al. |
| 2010/0058430 A1 | | 3/2010 | Jones et al. |
| 2010/0083322 A1 | | 4/2010 | Rouse |
| 2010/0177642 A1 | | 7/2010 | Sebastian et al. |
| 2010/0179984 A1 | | 7/2010 | Sebastian |
| 2010/0179986 A1 | | 7/2010 | Sebastian et al. |
| 2010/0179987 A1 | | 7/2010 | Sebastian et al. |
| 2010/0180046 A1 | | 7/2010 | Sebastian et al. |
| 2010/0185730 A1 | | 7/2010 | Sebastian |

(56) References Cited

U.S. PATENT DOCUMENTS

| | | |
|---|---|---|
| 2010/0281105 A1 | 11/2010 | Sebastian |
| 2011/0140840 A1* | 6/2011 | Hardacker .............. H04N 5/66 |
| | | 340/5.83 |
| 2012/0039231 A1 | 2/2012 | Suri et al. |
| 2012/0060121 A1 | 3/2012 | Goldberg et al. |
| 2012/0072933 A1 | 3/2012 | Moore |
| 2012/0184309 A1 | 7/2012 | Cohen |
| 2012/0320916 A1 | 12/2012 | Sebastian |
| 2013/0185387 A1 | 7/2013 | Gero |
| 2013/0282863 A1 | 10/2013 | Sebastian et al. |
| 2014/0029612 A1 | 1/2014 | Sebastian et al. |
| 2014/0040353 A1 | 2/2014 | Sebastian et al. |
| 2014/0193027 A1 | 7/2014 | Scherf et al. |
| 2015/0026241 A1 | 1/2015 | Sebastian |
| 2015/0032848 A1 | 1/2015 | Sebastian et al. |
| 2015/0036686 A1 | 2/2015 | Sebastian |
| 2015/0127715 A1 | 5/2015 | Dankberg |
| 2016/0330259 A1 | 11/2016 | Sebastian et al. |

FOREIGN PATENT DOCUMENTS

| | | |
|---|---|---|
| WO | WO-2001/084777 A2 | 11/2001 |
| WO | WO-2002/041527 A1 | 5/2002 |
| WO | WO-2004/036362 A2 | 4/2004 |
| WO | WO-2007/051079 A2 | 5/2007 |
| WO | WO-2010/083214 A2 | 7/2010 |
| WO | WO-2010/083248 A2 | 7/2010 |

OTHER PUBLICATIONS

Fonseca et al., BitTorrent Protocol—BTP/1.0, Version 1.0, Revision 1.33, Apr. 2005, DIKU, http://jonas.nitro.dk/bittorrent/bittorrent-rfc.html, 15 pgs.

Decision on Appeal mailed in U.S. Appl. No. 12/651,909 dated Jul. 30, 2015, Appeal No. 2013-006223, 20 pgs.

Notice of Allowance mailed in U.S. Appl. No. 12/651,909 dated Oct. 15, 2015, 8 pgs.

Notice of Allowance mailed in U.S. Appl. No. 13/517,860 dated Aug. 27, 2014, 7 pgs.

Non-Final Office Action mailed in U.S. Appl. No. 14/046,781 dated Nov. 16, 2015, 29 pgs.

Non-Final Office Action mailed in U.S. Appl. No. 14/070,977 dated Oct. 8, 2015, 24 pgs.

Non-Final Office Action mailed in U.S. Appl. No. 14/288,188 dated Mar. 13, 2015, 6 pgs.

Notice of Allowance mailed in U.S. Appl. No. 14/288,188 dated Jun. 29, 2015, 9 pgs.

Non-Final Office Action mailed in U.S. Appl. No. 14/453,479 dated Mar. 13, 2015, 7 pgs.

Notice of Allowance mailed in U.S. Appl. No. 14/453,479 dated Sep. 14, 2015, 7 pgs.

Extended European Search Report mailed in European Patent Application No. 12171996.7 dated Feb. 2, 2015, 8 pgs.

Non-Final Office Action mailed in U.S. Appl. No. 14/517,337 dated Dec. 31, 2015, 20 pgs.

Notice of Allowance mailed in U.S. Appl. No. 14/453,479 dated Jan. 21, 2016, 8 pgs.

Notice of Allowance mailed in U.S. Appl. No. 12/651,909 dated Feb. 5, 2016, 8 pgs.

Final Office Action mailed in U.S. Appl. No. 14/046,781 dated Jun. 20, 2016, 26 pgs.

Advisory Action mailed in U.S. Appl. No. 14/070,977 dated May 5, 2016, 3 pgs.

Non-Final Office Action mailed in U.S. Appl. No. 14/070,977 dated Jul. 18, 2016, 28 pgs.

Final Office Action mailed in U.S. Appl. No. 14/517,337 dated May 24, 2016, 22 pgs.

Frantzeskou et al., "Effective Identification of Source Code Authors Using Byte-Level Information," ICSE '06, May 20-28, 2006, Shanghai, China, ACM 1-59593-085-X/06/0005, XP040040085, pp. 893-896.

Paul et al., "Distributed caching with centralized control," Computer Communications, vol. 24, Issue 2, Feb. 1, 2001, pp. 256-268.

Selvakumar et al., "Implementation and comparison of distributed caching schemes," Computer Communications, vol. 24, Issues 7-8, Apr. 1, 2001, pp. 677-684.

International Search Report and Written Opinion mailed in International Application No. PCT/US2010/020897 dated Aug. 16, 2010, 15 pgs.

International Preliminary Report on Patentability mailed in International Application No. PCT/US2010/020897 dated Jul. 19, 2011, 10 pgs.

International Search Report and Written Opinion mailed in International Application No. PCT/US2010/020940 dated Sep. 22, 2010, 15 pgs.

International Preliminary Report on Patentability mailed in International Application No. PCT/US2010/020940 dated Jul. 19, 2011, 10 pgs.

Non-Final Office Action mailed in U.S. Appl. No. 12/651,909 dated Feb. 1, 2012, 22 pgs.

Applicant-Initiated Interview Summary mailed in U.S. Appl. No. 12/651,909 dated Apr. 16, 2012, 3 pgs.

Amendment and Response to Non-Final Office Action filed in U.S. Appl. No. 12/651,909 dated Apr. 27, 2012, 14 pgs.

Final Office Action mailed in U.S. Appl. No. 12/651,909 dated Jun. 22, 2012, 19 pgs.

Notice of Appeal and Pre-Appeal Brief Request for Review filed in U.S. Appl. No. 12/651,909 dated Aug. 21, 2012, 6 pgs.

Notice of Panel Decision from Pre-Appeal Brief Review mailed in U.S. Appl. No. 12/651,909 dated Sep. 28, 2012, 2 pgs.

Appeal Brief filed in U.S. Appl. No. 12/651,909 dated Nov. 27, 2012, 28 pgs.

Examiner's Answer to Appeal Brief mailed in U.S. Appl. No. 12/651,909 dated Jan. 31, 2013, 12 pgs.

Reply Brief filed in U.S. Appl. No. 12/651,909 dated Mar. 29, 2013, 3 pgs.

Patent Trial and Appeal Board Docketing Notice mailed in U.S. Appl. No. 12/651,909 on Apr. 17, 2013, Appeal No. 2013-006223, 2 pgs.

Non-Final Office Action mailed in U.S. Appl. No. 13/517,860 dated Mar. 25, 2014, 13 pgs.

Applicant-Initiated Interview Summary mailed in U.S. Appl. No. 13/517,860 dated Jul. 21, 2014, 3 pgs.

Amendment and Response to Non-Final Office Action filed in U.S. Appl. No. 13/517,860 dated Jul. 25, 2014, 13 pgs.

Non-Final Office Action mailed in U.S. Appl. No. 13/908,960 dated Dec. 23, 2013, 6 pgs.

Response to Non-Final Office Action filed with Terminal Disclaimer in U.S. Appl. No. 13/908,960 dated Mar. 24, 2014, 12 pgs.

Notice of Allowance mailed in U.S. Appl. No. 13/908,960 dated Apr. 4, 2014, 7 pgs.

Notice of Allowance mailed in U.S. Appl. No. 13/908,960 dated May 9, 2014, 7 pgs.

U.S. Appl. No. 13/919,861, filed Jun. 17, 2013, 98 pgs.

U.S. Appl. No. 14/046,781, filed Oct. 4, 2013, 63 pgs.

U.S. Appl. No. 14/070,977, filed Nov. 4, 2013, 38 pgs.

U.S. Appl. No. 14/288,188, filed May 27, 2014, 84 pgs.

Non-Final Office Action mailed in U.S. Appl. No. 14/517,337 dated Jan. 26, 2017, 25 pgs.

Final Office Action mailed in U.S. Appl. No. 14/070,977 dated Jan. 27, 2017, 22 pgs.

Non-Final Office Action mailed in U.S. Appl. No. 13/919,861 dated Oct. 6, 2016, 18 pgs.

Notice of Panel Decision from Pre-Appeal Brief Review mailed in U.S. Appl. No. 14/046,781 dated Nov. 15, 2016, 3 pgs.

Advisory Action mailed in U.S. Appl. No. 14/517,337 dated Aug. 23, 2016, 4 pgs.

Notice of Allowance mailed in U.S. Appl. No. 13/919,861 dated May 15, 2017, 19 pgs.

Final Office Action mailed in U.S. Appl. No. 14/517,337 dated Jul. 11, 2017, 31 pgs.

Non-Final Office Action mailed in U.S. Appl. No. 14/046,781 dated Aug. 24, 2017, 24 pgs.

(56) References Cited

OTHER PUBLICATIONS

Notice of Allowance mailed in U.S. Appl. No. 14/517,337 dated Nov. 24, 2017, 8 pgs.
U.S. Appl. No. 15/914,807, filed Mar. 7, 2018, 69 pgs.
Final Office Action mailed in U.S. Appl. No. 14/046,781 dated May 4, 2018, 23 pgs.
Non-Final Office Action mailed in U.S. Appl. No. 15/225,538 dated Jun. 6, 2018, 12 pgs.

* cited by examiner

CONTENT SET BASED DELTACASTING

CROSS-REFERENCES

This application claims the benefit and is a divisional of U.S. application Ser. No. 12/685,729, filed on Jan. 12, 2010, titled, "CONTENT SET BASED DELTACASTING," which is a non-provisional of U.S. Provisional Application Ser. No. 61/144,363, filed on Jan. 13, 2009, titled "SATELLITE MULTICASTING," and U.S. Provisional Application Ser. No. 61/170,359, filed on Apr. 17, 2009, titled "DISTRIBUTED BASE STATION SATELLITE TOPOLOGY," all of which are hereby expressly incorporated by reference in their entirety for all purposes.

This application is also related to U.S. patent application Ser. No. 12/651,909, titled "DELTACASTING," filed on Jan. 4, 2010, which is hereby expressly incorporated by reference in its entirety for all purposes.

BACKGROUND

This disclosure relates in general to communications and, but not by way of limitation, to multicast optimization over links of a communications system.

In some topologies of communications systems, groups of users share some or all of the forward link. For example, in some satellite communications systems, users share spot beams for communicating with a service provider (e.g., via a base station and/or gateway). Communication services provided to the users over the shared forward link may be affected by a number of factors, including bandwidth and other link conditions. For example, because all users sharing the forward link also share the link's bandwidth, any unnecessary redundancies in communications may cause sub-optimal utilization of the forward link.

As such, it may be desirable to optimize utilization of the shared forward link by minimizing redundancies.

SUMMARY

Among other things, methods, systems, devices, and software are provided for improving utilization of the satellite communications system through various "deltacasting" techniques for handling content sets (e.g., feeds or websites). Embodiments operate in a client-server context, including a server optimizer, a client optimizer, and, in some embodiments, a pre-positioning client. Within this client-server context, content sets are multicast to end users of the communications system and are handled at the content set level, according to set-level metadata and/or user preferences. In some embodiments, when locally stored information from the content sets is requested by a user, deltacasting techniques are used to generate fingerprints for use in identifying and exploiting multicasting and/or other opportunities for increased utilization of links of the communications system.

In one set of embodiments, a method is provided for multicasting over a communications system having a communications path between a server side of the communications system and a plurality of clients, the communications path including a shared forward link over which bandwidth resources are shared during a multicast communication. The method includes: intercepting a data block at the server side of the communications system, the data block having a header portion and a content portion and being communicated as part of a content set over the communications path, the content set having a plurality of content objects and being identified by a content set identifier; associating the data block with the content set identifier; generating a fingerprint using byte-level information comprised by the content portion of the data block; determining whether to multicast the data block over the communications path according to the fingerprint; and when it is determined to multicast the data block: multicasting the data block over the communications path; and using the content set identifier to determine whether a client accepts the data block multicast over the communications path. In certain embodiments, using the content set identifier to determine whether the client accepts the data block multicast over the communications path includes determining, at the server side of the communications system, whether to include the client in a multicast group, wherein the data block is multicast over the communications path according to the multicast group. In other embodiments, using the content set identifier to determine whether the client accepts the data block multicast over the communications path includes determining, at the client, whether to locally store the data block according to the content set identifier.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1A:
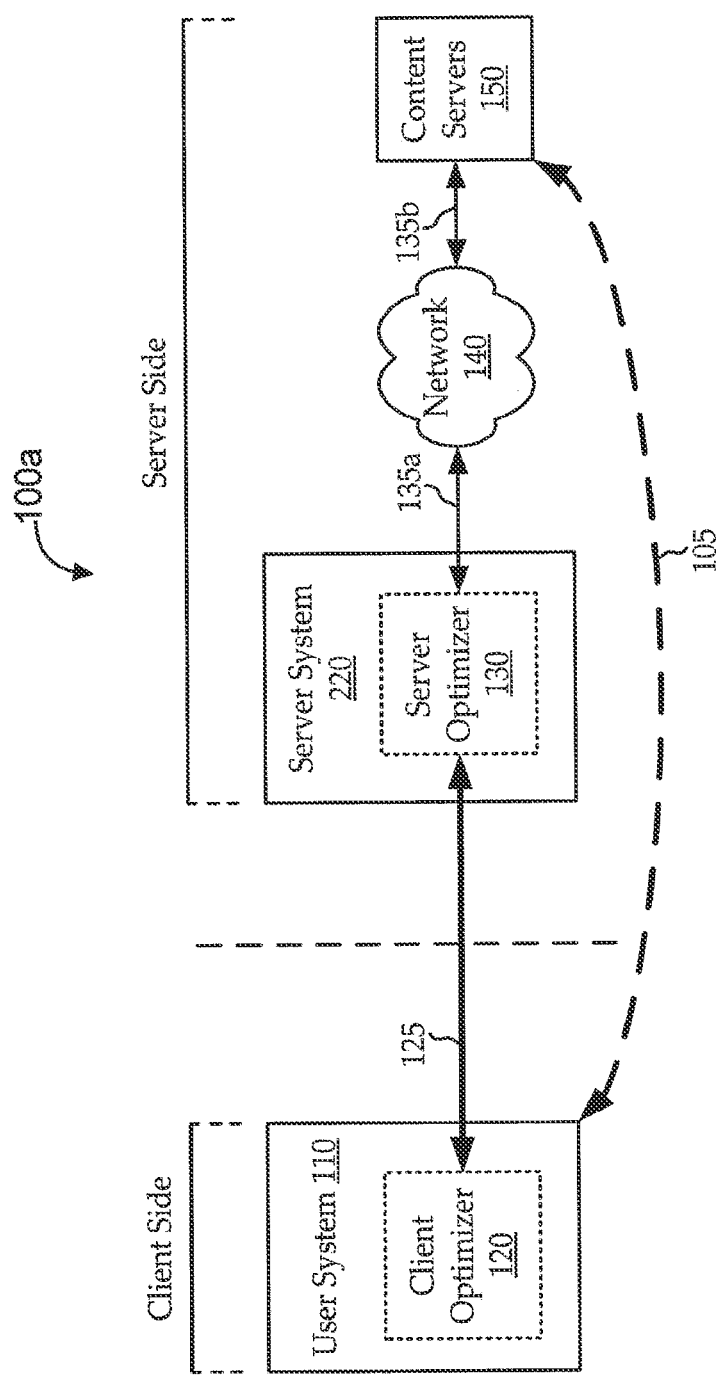
FIG. 1A shows a simplified block diagram of one embodiment of a communications system for use with various embodiments.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Embodiments are described herein for improving utilization of the satellite communications system through various "deltacasting" techniques for handling content sets. As used herein, "content sets" include any grouping of content intended to be called as a group and characterizable as a group by set-level metadata. In one example, a content set is an item in a really simple syndication (RSS) feed, characterized by channel metadata and/or item metadata.

In another example, a content set is a web page, characterized by certain HTTP metadata. When a user requests the content set (e.g., by entering a uniform resource locator (URL), clicking on a link in an RSS reader, etc.), a set of content files is invoked.

For example, when a link to a "video" is selected in an RSS reader, the link may, in fact, cause a web page to build using a number of calls to one or more content sources. The resulting web page may include the requested "video" and other content, including a banner advertisement, a logo image, etc. As such, the "video" link is actually a link to a content set characterized at least partially by metadata associated with the link at the set level (e.g., as opposed to the object-level metadata associated with each content object file called as part of the content set).

Various embodiments exploit content sets to provide set-level handling functionality in the context of otherwise substantially transparent client-server transactions. In effect, embodiments provide functionality of a transparent, man-in-the-middle optimizer (e.g., a protocol-agnostic accelerator) with a certain level of content awareness for additional functionality. For example, content sets are multicast (e.g., anticipatorily pre-positioned in a local dictionary) to end users of the communications system and are handled (e.g., at the client side) at the content set level, according to set-level metadata and/or user preferences. In some embodiments, when locally stored information from the content sets is requested by a user, deltacasting techniques are used to generate fingerprints for use in identifying and exploiting multicasting and/or other opportunities for increased utilization of links of the communications system.

Referring first to FIG. 1A, a simplified block diagram is shown of one embodiment of a communications system 100a for use with various embodiments. The communications system 100a facilitates communications between a user system 110 and a content server 150 via a client optimizer 120, a server optimizer 130, and a network 140. The client optimizer 120 and the server optimizer 130 are configured to effectively provide an optimizer tunnel 105 between the user system 110 and the content server 150, including providing certain communications functionality.

Embodiments of the optimizer (e.g., the server optimizer 130, the client optimizer 120, and the resulting optimizer tunnel 105) can be implemented in a number of ways without departing from the scope of the invention. In some embodiments, the optimizer is implemented as a proxy, such that the server optimizer 130 is a proxy server, the client optimizer 120 is a proxy client, and the optimizer tunnel 105 is a proxy tunnel. For example, a transparent intercept proxy can be used to intercept traffic in a way that is substantially transparent to users at the client-side of the proxy tunnel. In other embodiments, the optimizer is implemented as an in-line optimizer. For example, the client optimizer 120 is implemented within a user terminal and the server optimizer 130 is implemented within a provider terminal (e.g., a satellite base station or gateway, a cable head-end, a digital subscriber line access multiplexer (DSLAM), etc.). Other configurations are possible in other embodiments. For example, embodiments of the server optimizer 130 are implemented in the Internet cloud (e.g., on commercial network leased server space). Embodiments of the client optimizer 120 are implemented within a user's personal computer, within a user's modem, in a physically separate component at the customer premises, etc.

It is worth noting that references herein to "intercepting" data should be construed broadly to include any useful slowing, sampling, re-routing, and/or other techniques that allow processing of the data as required according to various embodiments. In some embodiments, traffic passes through the server optimizer 130, where it is "intercepted" by being buffered for analysis and processing. For example, the buffering may be used to slow and accumulate traffic for fingerprint generation and analysis, as described more fully below. Notably, certain embodiments described as using an optimizer component (e.g., the server optimizer 130) to intercept the traffic may actually be implemented by having a different component intercept the traffic, from which the optimizer component may receive the intercepted traffic for processing.

Embodiments of the user system 110 may include any component or components for providing a user with network interactivity. For example, the user system 110 may include any type of computational device, network interface device, communications device, or other device for communicating data to and from the user. Typically, the communications system 100a facilitates communications between multiple user systems 110 and a variety of content servers 150 over one or more networks 140 (only one of each is shown in FIG. 1A for the sake of clarity). The content servers 150 are in communication with the server optimizer 130 via one or more networks 140. The network 140 may be any type of network 140 and can include, for example, the Internet, an Internet protocol ("IP") network, an intranet, a wide-area network ("WAN"), a local-area network ("LAN"), a virtual private network ("VPN"), the Public Switched Telephone Network ("PSTN"), and/or any other type of network 140 supporting data communication between devices described herein, in different embodiments. The network 140 may also include both wired and wireless connections, including optical links.

As used herein, "content servers" is intended broadly to include any source of content in which the users may be interested. For example, a content server 150 may provide website content, television content, file sharing, multimedia serving, voice-over-Internet-protocol (VoIP) handling, and/or any other useful content. It is worth noting that, in some embodiments, the content servers 150 are in direct communication with the server optimizer 130 (e.g., not through the network 140). For example, the server optimizer 130 may be located in a gateway that includes a content or application server. As such, discussions of embodiments herein with respect to communications with content servers 150 over the network 140 are intended only to be illustrative, and should not be construed as limiting.

In some embodiments, when the user system 110 communicates with the content server 150, the server optimizer 130 intercepts the communications for one or more purposes. As described below, the server optimizer 130 may be part of a server system 220 that includes components for server-side communications (e.g., base stations, gateways, satellite modem termination systems (SMTSs), digital subscriber line access multiplexers (DSLAMs), etc., as described below with reference to FIG. 2). The server optimizer 130 may act as a transparent and/or intercepting proxy. For example, the client optimizer 120 is in communication with the server optimizer 130 over a client-server communication link 125, and the server optimizer 130 is in communication with the content server 150 over a content network link 135. The server optimizer 130 may act as a transparent man-in-the-middle to intercept the data as it passes between the client-server communication link 125 and the content network link 135. Some purposes of the interception may include filtering, caching, parsing, and/or otherwise processing the requests and responses. For example, when the user system 110 requests a web object from a content server 150, the server optimizer 130 may intercept and parse the request to implement prefetching and/or other types of functionality.

As described more fully below, embodiments of the server optimizer 130 use various techniques (e.g., dictionary coding) to identify redundancies between incoming data and data previously sent across the links of the communication system 100a (e.g., the client-server communication link 125 and the content network link 135). In particular, various techniques (e.g. delta coding, wide dictionary coding, etc.) may allow identification of redundancies in byte sequences traversing the links even when a large history is maintained. These techniques may be used to identify and exploit opportunities for multicasting to increase utilization of the communications links. Use of these techniques to identify and exploit these multicast opportunities is referred to herein as "deltacasting."

It will be appreciated that "delta coding," "dictionary coding," "dictionary," "deltacasting," and other similar terms and phrases are intended to be broadly construed to include use of any type of dictionary-like structure for optimization. Embodiments of the dictionary include chunks of content data (e.g., implemented as delta dictionaries, wide dictionaries, byte caches, and/or other types of dictionary structures). For example, when content data is stored in the dictionary, some or all of the blocks of data defining the content are stored in the dictionary in an unordered, but indexed way. As such, content may not be directly accessible from the dictionary; rather, the set of indexes may be needed to recreate the content from the set of unordered blocks.

It is worth noting that data may be communicated over a communications system 100a using one or more protocols that define, among other things, the format for the datagrams (e.g., packets, frames, etc.). Each datagram may typically include a header portion and a content portion. As used herein, the term "header" is intended broadly to include any portions of the datagram other than those used to communicate the actual content (e.g., file data), and is not intended to be limited to any particular datagram format. For example, an Internet protocol (IP) packet may include a header at the beginning of each packet, while other types of datagrams may provide header-types of information in other ways (e.g., using preambles, post-ambles, mid-ambles, spread-ambles, sub-frames, separate signaling or control data, etc.). These header portions may include information, such as source address, destination address, priority, packet length, coding information, modulation information, etc. Of course, those of skill in the art will appreciate that similar categories of header-portion and content-portion information may be found within datagrams of other protocol formats (e.g., HTTP, FTP, etc.).

Much can be gleaned from the header portions of data. For example, the header portion may include metadata or other information about the content portion that can be used to help characterize the content portion of the data. In fact, this technique may be used by certain types of content delivery systems, like a video-on-demand (VOD) system. A VOD system may include an application running at a VOD content server and/or at the end viewer's customer premises equipment (CPE) (e.g., on a set-top box) for parsing and translating proprietary metadata from packet headers of user requests. Notably, while use of the metadata may provide relatively straightforward knowledge of the content being requested, using proprietary tags in this way may require having access to (e.g., and running an application on) the content server.

For example, a parsed URL may look as follows: "http://www.VOD.com/movieplayer?70AX05nkd4868PR1D5_g." The illustrative URL includes a string of characters generated as part of a proprietary application function, and may be decoded by the VOD server application to identify information, including the particular download requested, an identifier for the session, user or account data, shopping cart data, client playback capabilities, etc. As such, another request for the same VOD movie, even from the same content server, may have different URLs (e.g., different request headers). While the VOD application server may be able to understand the requests as being for the same movie (e.g., the VOD applications server will understand which bytes specify the content), a transparent intercept proxy, like that of embodiments of the server optimizer 130, may not be able to determine this from the metadata alone.

Embodiments of the server optimizer 130 generate fingerprints (e.g., fingerprints, digests, signatures, hash functions, etc.) from the content portion of the data traversing the communication links. The server optimizer 130 intercepts and analyzes the byte-level data of the content portion in a way that is substantially transparent to the user. Embodiments of the fingerprints are generated so as to be useful in identifying redundancies between the incoming intercepted data and previously processed data. For example, hashing functions are applied to traffic, after being intercepted by the server optimizer 130, for use as identifiers (e.g., "weak" identifiers) that are at least strong enough to identify candidate matches with blocks stored in a dictionary. Some embodiments of the fingerprints are generated so as to be useful further as strong identifiers for representing substantially identical matching blocks stored in a dictionary.

A number of difficulties arise from implementing this type of optimizer to use fingerprints (e.g., rather than metadata or other header information). In one example, as described above, header data (e.g., particularly proprietary metadata) may be used to make a number of determinations (e.g., precisely what object file is being requested) that may be difficult or impossible to make from the content data alone. In another example, proprietary data or limited content environments may allow certain assumptions to be made. For example, when someone requests a VOD movie, the server may know exactly what bytes are being requested (e.g., whatever bytes are associated with that particular movie file on the VOD server), how large the file is, that the viewer is likely to watch the movie sequentially, where the movie is stored, etc. However, by using the content portion of the data to generate fingerprints, embodiments of the server optimizer 130 are relatively agnostic to the content being analyzed, which may provide certain functionality even where the server optimizer 130 has little or no access to proprietary metadata and/or other header information.

In some embodiments, for example, the server optimizer 130 generates fingerprints of data being received over the content network link 135 in response to various requests from different users on a shared spot beam of a satellite communications system (e.g., where the requests are fulfilled by the server optimizer 130 over the client-server link 125 of the communications system 100*a*). The server optimizer 130 determines from the fingerprints that multiple users are requesting the same content at substantially the same time. In response, the server optimizer 130 creates a multicast service flow (e.g., on the client-server link 125) over which it multicasts the requested data to all the requesting users, thereby saving bandwidth relative to unicasting multiple copies of the content to the multiple users.

It is worth noting that embodiments of the client-server communication link 125 (e.g., between the client optimizer 120 and the server optimizer 130) and the content network link 135 (e.g., between the server optimizer 130 and the content servers 150 via the networks 140) can be implemented as various types of links have different and/or changing link characteristics, including, for example, differences in bandwidth, latency, cost per bit, etc. For example, while certain embodiments are described in the context of a satellite communications system, where the client-server communication link 125 includes at least one satellite link, other topologies and link types are possible.

Figure 1B:
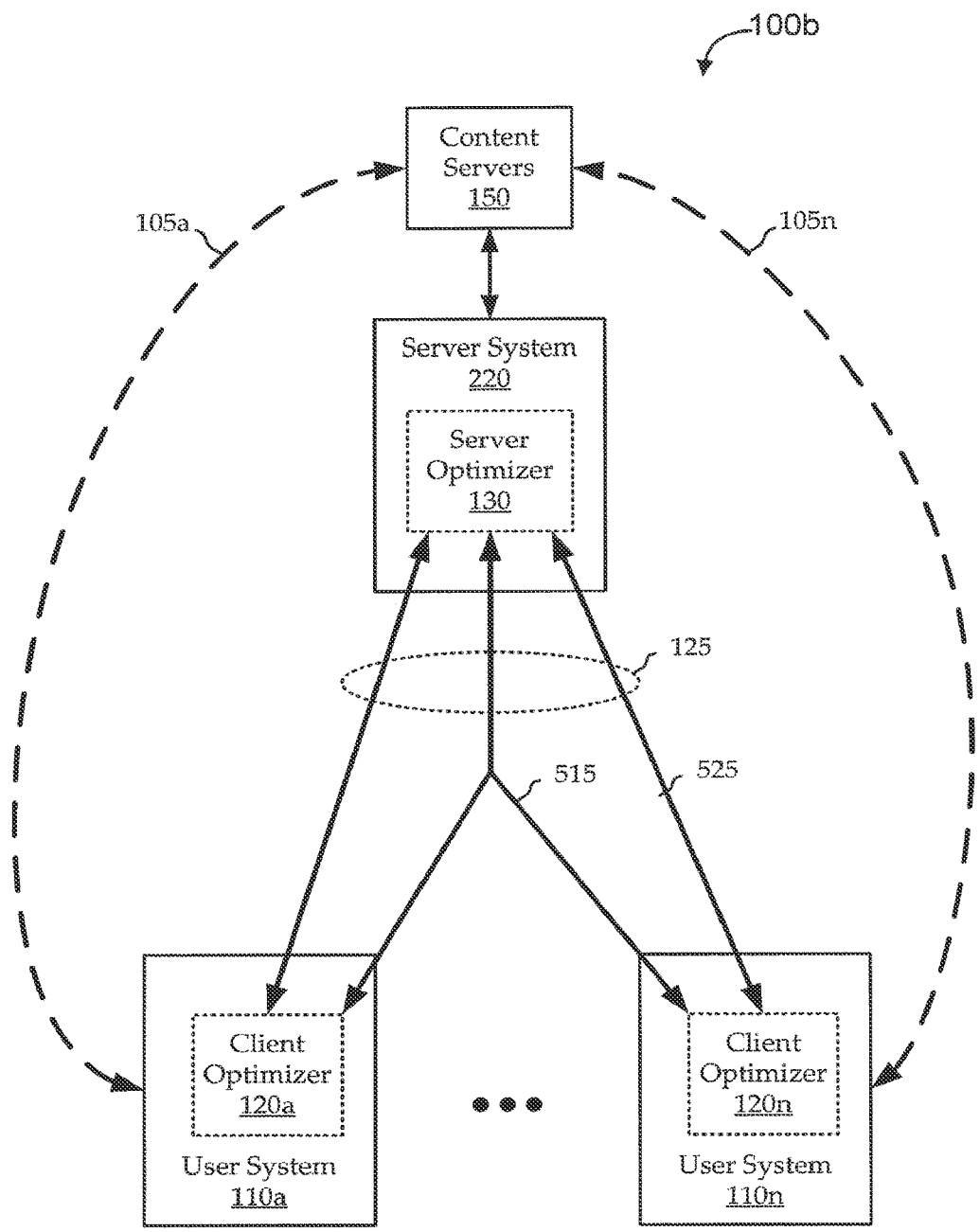
FIG. 1B shows a simplified block diagram of another embodiment of a communications system having multiple optimizer tunnels for use with various embodiments.

While the communications system 100*a* illustrated in FIG. 1A shows only one optimizer tunnel 105 between one server system 220 and one user system 110, embodiments typically operate in the context of, and take advantage of, multiple optimizer tunnels 105. FIG. 1B shows a simplified block diagram of another embodiment of a communications system 100*b* having multiple optimizer tunnels 105 for use with various embodiments. The communications system 100*b* facilitates communications between a server system 220 and multiple user systems 110, via a respective server optimizer 130 and multiple client optimizers 120. The client optimizers 120 and the server optimizer 130 are configured to effectively provide tunnels 105 between the user systems 110 and content servers 150.

A client-server communication link 125 between the server optimizer 130 and the client optimizers 120 supports one or more unicast service flows 525 and one or more multicast service flows 515 for supporting unicast and multicast traffic, respectively. In one embodiment, the client-server communication link 125 includes a satellite communications link. It will be appreciated that satellites may effectively broadcast all their downstream traffic to all receivers that are tuned to a particular carrier, beam, etc. As such, unicasting or multicasting to one or more user systems 110 may, in fact, involve broadcasting the data over the satellite link and also broadcasting control data to direct receivers to either accept or ignore relevant portions of the broadcast data. Notably, while some system resources may be expended in setting up a multicast service flow 515 and in related logistics, it "costs" the satellite communications system substantially the same bandwidth resources to send a packet to one user system 110 or to all user systems 110 (e.g., on a particular spot beam).

Similarly, in another embodiment, the client-server communication link 125 includes a cable communications link. For example, a cable company may run a cable line to a neighborhood aggregator, from which individual coaxial lines communicate last mile traffic to individual households. Each individual coaxial cable may carry all the traffic for the entire neighborhood, even where some of that traffic is destined only for particular households. As in the satellite embodiment described above, since all the cable subscriber households in the same neighborhood effectively receive all the traffic, bandwidth resources can be shared by multicasting traffic, where appropriate. Of course, satellite and cable networks are only two illustrative embodiments of client-server communication links 125. Embodiments of the client-server communication link 125 can include any type of communications link that has limited bandwidth resources, where the bandwidth resources can be at least partially shared through multicasting.

Figure 2:
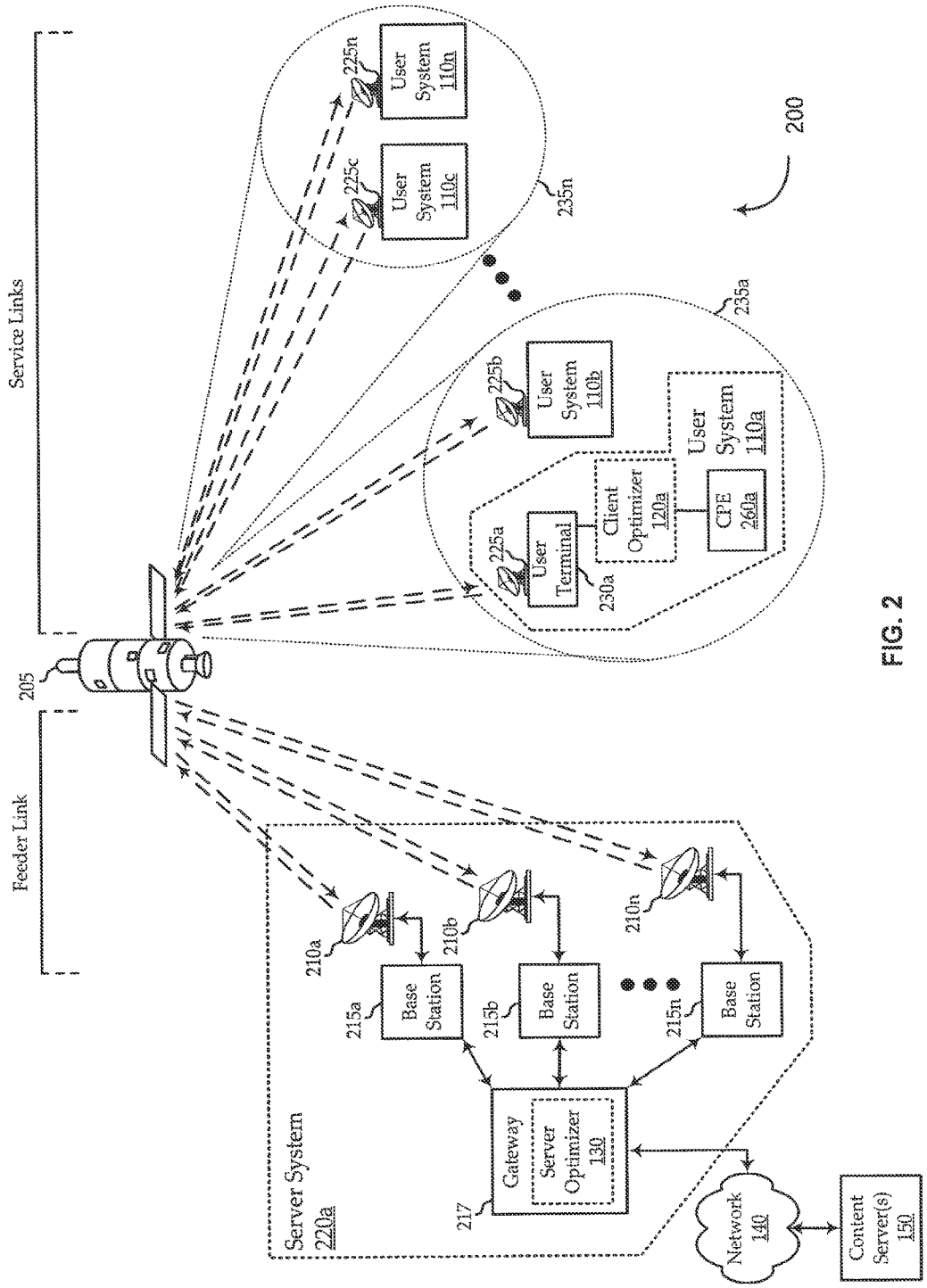
FIG. 2 shows a block diagram of an embodiment of a satellite communications system having a server system in communication with multiple user systems via a satellite over multiple spot beams, according to various embodiments.

It will now be appreciated that embodiments of the client-server communication link 125, and the resulting optimizer tunnels 105, effectively provide transparent acceleration functionality to the user systems 110. This functionality will be described in more detail with respect to illustrative systems in FIGS. 2-5. FIG. 2 shows a block diagram of an embodiment of a satellite communications system 200 having a server system 220 in communication with multiple user systems 110 via a satellite 205 over multiple spot beams 235, according to various embodiments. The server system 220 may include any server components, including base stations 215, gateways 217, etc. A base station 215 is sometimes referred to as a hub or ground station. In certain embodiments, as described below, the base station 215 has functionality that is the same or different from a gateway 217. For example, as illustrated, a gateway 217 provides an interface between the network 140 and the satellite 205 via a number of base stations 215. Various embodiments provide different types of interfaces between the gateways 217 and base stations 215. For example, the gateways 217 and base stations 215 may be in communication over leased high-bandwidth lines (e.g., raw Ethernet), a virtual private large-area network service (VPLS), an Internet protocol virtual private network (IP VPN), or any other public or private, wired or wireless network. Embodiments of the server system 220 are in communication with one or more content servers 150 via one or more networks 140.

In some embodiments, the gateway 217 is configured to implement relatively simple routing functions. For example, the gateway 217 may receive traffic from the network 140, determine which of the base stations 215 should receive the traffic, and route the traffic accordingly. In other embodiments, the gateway 217 performs relatively complex functions, including, for example, network security, accounting, content acceleration, trend analysis, signal processing and/or encoding, etc. In still other embodiments, the gateway 217 and the base stations 215 share some or all of the desired network functionality. For example, it may be desirable to perform certain functions in one location, perform other functions in a distributed manner, and perform still other functions in a redundant manner.

As traffic traverses the satellite communications system 200 in multiple directions, the gateway 217 may be configured to implement multi-directional communications functionality. For example, the gateway 217 may send data to and receive data from the base stations 215.

Similarly, the gateway 217 may be configured to receive data and information directed to one or more user systems 110, and format the data and information for delivery to the respective destination device via the satellite 205; or receive signals from the satellite 205 (e.g., from one or more user systems 110) directed to a destination in the network 140, and process the received signals for transmission through the network 140.

In one embodiment, the satellite communications system 200 includes a number of gateways 217 distributed over a large geographic region. Each gateway 217 is in communication with the network 140 via a high-speed connection (e.g., a dedicated high-bandwidth fiber link). Each gateway 217 is also in communication with, and handles communications for, up to twenty base stations 215 (e.g., twenty feeder links). Each of the twenty base stations 215 is configured to service up to four user links by communicating content for those user links to the satellite 205 using an antenna 210.

In various embodiments, one or more of the satellite links are capable of communicating using one or more communication schemes. In various embodiments, the communication schemes may be the same or different for different links. The communication schemes may include different types of coding and modulation combinations. For example, various satellite links may communicate using physical layer transmission modulation and coding techniques using adaptive coding and modulation schemes, etc. The communication schemes may also use one or more different types of multiplexing schemes, including Multi-Frequency Time-Division Multiple Access ("MF-TDMA"), Time-Division Multiple Access ("TDMA"), Frequency Division Multiple Access ("FDMA"), Orthogonal Frequency Division Multiple Access ("OFDMA"), Code Division Multiple Access ("CDMA"), or any number of other schemes.

Embodiments of the satellite 205 may be implemented as a geostationary satellite 205, a low earth orbit ("LEO") satellite 205, or aerial payloads not in orbit and held aloft by planes, blimps, weather balloons, etc. Other embodiments could have a number of satellites 205 instead of just one. In one embodiment, the satellite 205 is configured as a "bent pipe" satellite, wherein the satellite 205 may frequency convert the received carrier signals before retransmitting these signals to their destination, but otherwise perform little or no other processing on the contents of the signals. There could be a single carrier signal for each service spot beam 235 or multiple carriers in different embodiments. Similarly, single or multiple carrier signals could be used for feeder spot beams. A variety of physical layer transmission modulation and coding techniques may be used by the satellite 205 in accordance with certain embodiments, including those defined with the DVB-S2 standard. For other embodiments, a number of configurations are possible (e.g., using LEO satellites, mesh networks, star networks, etc.).

The satellite 205 may operate in a multi-beam mode, transmitting a number of spot beams 235, each directed at a different region of the earth. Each spot beam 235 may be associated with one of the user links, and used to communicate between the satellite 205 and a large group (e.g., thousands) of user systems 110 (e.g., user terminals 230 within the user systems 110). The signals transmitted from the satellite 205 may be received by one or more user systems 110, via a respective user antenna 225. In some embodiments, some or all of the user systems 110 include one or more user terminals 230 and one or more CPE devices 260. User terminals 230 may include modems, satellite modems, routers, or any other useful components for handling the user-side communications. Reference to "users" should be construed generally to include any user (e.g., subscriber, consumer, customer, etc.) of services provided over the satellite communications system 200 (e.g., by or through the server system 220).

In a given spot beam 235, some or all of the users (e.g., user systems 110) serviced by the spot beam 235 may be capable of receiving all the content traversing the spot beam 235 by virtue of the fact that the satellite communications system 200 employs wireless communications via various antennae (e.g., 210 and 225). However, some of the content may not be intended for receipt by certain customers. As such, the satellite communications system 200 may use various techniques to "direct" content to a user or group of users. For example, the content may be tagged (e.g., using packet header information according to a transmission protocol) with a certain destination identifier (e.g., an IP address), use different modcode points that can be reliably received only by certain user terminals 230, send control information to user systems 110 to direct the user systems 110 to ignore or accept certain communications, etc. Each user system 110 may then be adapted to handle the received data accordingly. For example, content destined for a particular user system 110 may be passed on to its respective CPE 260, while content not destined for the user system 110 may be ignored. In some cases, the user system 110 stores information not destined for the associated CPE 260 for use if the information is later found to be useful in avoiding traffic over the satellite link, as described in more detail below.

In some embodiments, each user system 110 implements a client optimizer 120 that is in communication with a server optimizer 130 located in the server system 220 (e.g., in the gateway 217). The client optimizers 120 and server optimizer 130 may act to create a virtual tunnel between the user systems 110 and the content servers 150, as described with reference to FIG. 1A. In a topology, like the satellite communications system 200 shown in FIG. 2, vast amounts of traffic may traverse various portions of the satellite communications system 200 at any given time. As discussed above, at least some of the traffic traversing the network may be intercepted by the server optimizer 130 for further processing and for additional functionality.

The functionality of the server optimizer 130 may also be assisted and/or exploited by other components of the server system 220 and the user systems 110. Some of this and other functionality of components of an illustrative server system 220 and an illustrative user system 110 are described with reference to various types of functional blocks in FIGS. 3 and 4, respectively.

Figure 3:
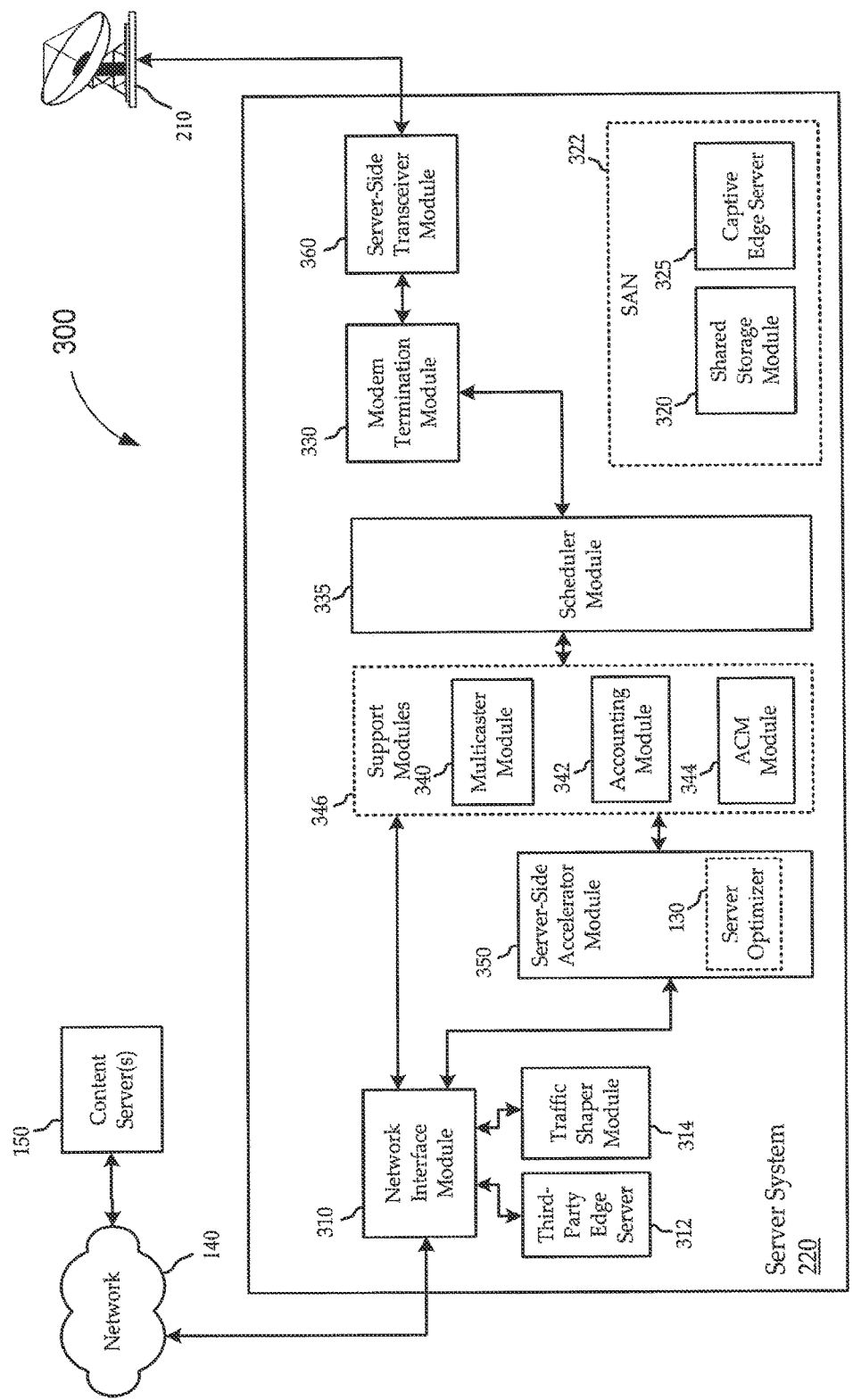
FIG. 3 shows a simplified block diagram illustrating an embodiment of a server system coupled between a network and an antenna, according to various embodiments.

FIG. 3 shows a simplified block diagram 300 illustrating an embodiment of a server system 220 coupled between a network 140 and an antenna 210, according to various embodiments. The server system 220 has a number of components, including a network interface module 310, a modem termination module 330, and a server-side transceiver module 360. Components of the server system 220 may be implemented, in whole or in part, in hardware. Thus, they may include one or more Application Specific Integrated Circuits (ASICs) adapted to perform a subset of the applicable functions in hardware. Alternatively, the functions may be performed by one or more other processing units (or cores), on one or more integrated circuits (ICs). In other embodiments, other types of integrated circuits may be used (e.g., Structured/Platform ASICs, Field Programmable Gate Arrays (FPGAs), and other Semi-Custom ICs), which may be programmed. Each may also be implemented, in whole or in part, with instructions embodied in a computer-readable medium, formatted to be executed by one or more general or application specific controllers.

Embodiments of the server system 220 receive data from the network 140 (e.g., the network 140 of FIG. 1A), including data originating from one or more content servers 150 (e.g., or other types of servers, as discussed above) and destined for one or more users in a spot beam (e.g., at a user system 110 in a spot beam 235, as shown in FIG. 2). The data is received at the network interface module 310, which includes one or more components for interfacing with the network 140. For example, the network interface module 310 includes a network switch and a router.

In some embodiments, the network interface module 310 interfaces with other modules, including a third-party edge server 312 and/or a traffic shaper module 314. The third-party edge server 312 may be adapted to mirror content (e.g., implementing transparent mirroring, like would be performed in a point of presence ("POP") of a content delivery network ("CDN")) to the server system 220. For example, the third-party edge server 312 may facilitate contractual relationships between content providers and service providers to move content closer to users in a communications network (e.g., the satellite communications network 200 of FIG. 2). The traffic shaper module 314 controls traffic from the network 140 through the server system 220, for example, to help optimize performance of the communications system (e.g., by reducing latency, increasing effective bandwidth, etc.). In one embodiment, the traffic shaper module 314 delays packets in a traffic stream to conform to a predetermined traffic profile.

Traffic is passed from the network interface module 310 to one or more processing modules. In some embodiments, the processing modules include a server-side accelerator module 350, a scheduler module 335, and support modules 346. In some embodiments, all traffic from the network interface module 310 is passed to the server-side accelerator module 350 for handling, as described more fully below. In other embodiments, some or all of the traffic from the server-side accelerator module 350 is passed to the support modules 346. For example, in one embodiment, real-time types of data (e.g., User Datagram Protocol ("UDP") data traffic, like Internet-protocol television ("IPTV") programming) bypass the server-side accelerator module 350, while non-real-time types of data (e.g., Transmission Control Protocol ("TCP") data traffic, like web video) are routed through the server-side accelerator module 350 for processing. Embodiments of the server-side accelerator module 350 provide various types of application, WAN/LAN, and/or other acceleration functionality. In one embodiment, the server-side accelerator module 350 implements functionality of AcceleNet applications from Intelligent Compression Technologies, Inc. ("ICT"), a division of ViaSat, Inc. This functionality may be used to exploit information from application layers of the protocol stack (e.g., layers 4-7 of the IP stack) through use of software or firmware operating in the user system 110 (e.g., in the user terminal 230 and/or the CPE 260).

In some embodiments, the server-side accelerator module 350 is adapted to provide high payload compression. This allows faster transfer of the data and enhances the effective capacity of the network. The server-side accelerator module 350 can also implement protocol-specific methods to reduce the number of round trips needed to complete a transaction, such as by prefetching objects embedded in HTTP pages. In other embodiments, functionality of the server-side accelerator module 350 is closely integrated with the satellite link through other modules, including the support modules 346, the scheduler module 335, the modem termination module 330, etc., to reduce upload bandwidth requirements and/or to more efficiently schedule to the satellite link. For example, the link layer may be used to determine whether packets are successfully delivered, and those packets can be tied more closely with the content they supported through application layer information. In certain embodiments, these and/or other functions of the server-side accelerator module 350 are provided by a server optimizer 130 resident on (e.g., or in communication with) the server-side accelerator module 350.

In some embodiments, the server optimizer 130 is implemented with multiple servers. Each of the multiple servers may be configured to handle a portion of the traffic passing through the server-side accelerator module 350. It is worth noting that functionality of various embodiments described herein use data which, at times, may be processed across multiple servers. As such, one or more server management modules may be provided for processing (e.g., tracking, routing, partitioning, etc.) data across the multiple servers. For example, when one server within the server optimizer 130 receives a request from a user (e.g., from a user system 110 on a spot beam 235, as shown in FIG. 2), the server management module may process that request in the context of other requests received at other servers in the server optimizer 130. In one embodiment, coordination between servers is implemented in support of singular storage of data. For example, it may be desirable to avoid caching the same byte sequence twice in two servers that are in communication with each other (e.g., where both servers are part of a storage area network 322 ("SAN") in the server system 220). In another embodiment, servers are configured to communicate to facilitate the identification of deltacasting (e.g., including multicasting and/or other) opportunities, as described more fully below.

It will be appreciated that, while the server optimizer 130 is illustrated as part of the server system 220, this should not be construed as limiting the location or implementation of the server optimizer 130. In one embodiment, the server optimizer 130 is implemented by a server in communication with the server system 220 over the network 140. For example, a third party may lease server space that is accessible over the Internet or a private connection (e.g., a high-speed fiber connection). The leased server space may be used for serving the server optimizer 130.

Data processed by the server-side accelerator module 350 may pass through the support modules 346 to the scheduler module 335. Embodiments of the support modules 346 include one or more types of modules for supporting the functionality of the modem termination module 330, for example, including a multicaster module 340, a fair access policy ("FAP") module 342, and an adaptive coding and modulation ("ACM") module 344. In certain embodiments, some or all of the support modules 346 include off-the-shelf types of components.

Embodiments of the multicaster module 340 provide various functions relating to multicasting of data over the links of the communications system. Certain embodiments of the multicaster module 340 use data generated by other processing modules (e.g., the server-side accelerator module 350) to prepare traffic for multicasting. For example, the multicaster module 340 may prepare datagrams as a multicast stream. Other embodiments of the multicaster module 340 perform more complex multicasting-related functionality. For example, the multicaster module 340 may contribute to determinations of whether data is unicast or multicast to one or more users (e.g., using information generated by the server-side accelerator module 350), what modcodes to use, whether data should or should not be sent as a function of data stored at destination user terminals 230, how to handle certain types of encryption, etc.

Embodiments of the accounting module 342 implement various accounting-related functions. In one embodiment, the accounting module 342 collects data from multiple components to determine how much network usage to attribute to a particular user. For example, the accounting module 342 may determine how to count upload or download traffic against a user's fair access policy (FAP). In another embodiment, the accounting module 342 dynamically adjusts FAPs according to various network link and/or usage conditions. For example, the accounting module 342 may adjust FAPs to encourage network usage during lower traffic times. In yet another embodiment, the accounting module 342 affects the operation of other components of the modem termination module 330 as a function of certain FAP and/or other accounting conditions. For example, the accounting module 342 may direct the multicaster module 340 to multicast certain types of data or to prevent certain users from joining certain multicast streams as a function of FAP or other considerations.

Embodiments of the ACM module 344 implement various ACM functions. For example, the ACM module 344 may track link conditions for certain spot beams, users, etc., for use in dynamically adjusting modulation and/or coding schemes. In some embodiments, the ACM module 344 may help determine which users should be included in which customer groupings or multicast streams as a function of optimizing resources through modcode settings. In certain embodiments, the ACM module 344 implements ACM-aware encoding of data adapted for progressive encoding. For example, MPEG-4 video data may be adapted for progressive encoding in layers (e.g., a base layer and enhancement layers). The ACM module 344 may be configured to set an appropriate modcode separately for each layer to optimize video delivery.

When traffic has been processed by the server-side accelerator module 350 and/or the support modules 346, the traffic is passed to the scheduler module 335. Embodiments of the scheduler module 335 are configured to provide various functions relating to scheduling the links of the communications system handled by the server system 220. For example, the scheduler module 335 may manage link bandwidth by scheduling license grants within a spot beam.

In some embodiments, functionality of the server system 220 involves communication and interaction with the SAN 322. Embodiments of the SAN 322 include a shared storage module 320, which may include any useful type of memory store for various types of functionality of the server system 220. For example, the shared storage module 320 may include volatile or non-volatile storage, servers, files, queues, etc. In certain embodiments, the SAN 322 further includes a captive edge server 325, which may be in communication with the shared storage module 320. In some embodiments, the captive edge server 325 provides functionality similar to that of the third-party edge server 312, including content mirroring. For example, the captive edge server 325 may facilitate different contractual relationships from those of the third-party edge server 312 (e.g., between the server system 220 provider and various content providers). In certain embodiments, the captive edge server 325 and/or the third-party edge server 312 are in communication with server-side storage (e.g., within the SAN 322).

It will be appreciated that components of the server system 220 may provide many different types of functionality. For example, some embodiments oversee a variety of decoding, interleaving, decryption, and unscrambling techniques. Other embodiments manage functions applicable to the communication of content downstream through a satellite (e.g., the satellite 205 of FIG. 2) to one or more users (e.g., user systems 110 of FIG. 2). As described more fully below with reference to various embodiments, the server system 220 may handle different types of traffic in different ways. For example, some uses of the communications system involve contractual relationships and/or obligations with third-party content providers to interface with their edge servers (e.g., through the third-party edge server 312), while other uses involve locally "re-hosting" certain content (e.g., through the captive edge server 325). Further, some use cases handle real-time types of data (e.g., UDP data) differently from non-real-time types of data (e.g., TCP data). Many other uses are possible.

In certain embodiments, some or all of these downstream communications functions are handled by the server-side transceiver module 360. Embodiments of the server-side transceiver module 360 encode and/or modulate data, using one or more error correction techniques, adaptive encoding techniques, baseband encapsulation, frame creation, etc. (e.g., using various modcodes, lookup tables, etc.). Other functions may also be performed by the server-side transceiver module 360 or other components of the server system 220, including upconverting, amplifying, filtering, tuning, tracking, etc. For example, in the context of the satellite communications system 200 of FIG. 2, the server-side transceiver module 360 may communicate data to one or more antennae 210 for transmission via the satellite 205 to the user systems 110. Embodiments of the server system 220 also include the modem termination module 330 for receiving modem traffic over the satellite link from users. In some embodiments, the modem termination module 330 is configured substantially as a satellite modem termination system ("SMTS").

In other embodiments, downstream functions and or other functions of the server system 220 are centralized and/or distributed according to various embodiments of the invention. For example, as shown in FIG. 2, a server system 220 may include a number of base stations 215, gateways 217, and/or other components (e.g., hubs, cross-connects, cores, etc.). Similarly, in other types of communications systems, multiple server system 220 components may perform various functions on the server-side of the communications system. In some embodiments, substantially each server system 220 node (e.g., each base station 215, gateway 217, etc.) is capable of performing substantially all the server system 220 functionality. In other embodiments, much of the advanced processing server system 220 functionality is implemented in edge nodes (e.g., base stations 215) of the server system 220, while other nodes (e.g., gateways 217, cores, cross-connects, etc.) provide more basic routing and/or switching functions. In still other embodiments, edge node functionality is fairly limited, while advanced processing functions are more centralized (e.g., in gateways 217, core nodes, etc.).

Figure 4:
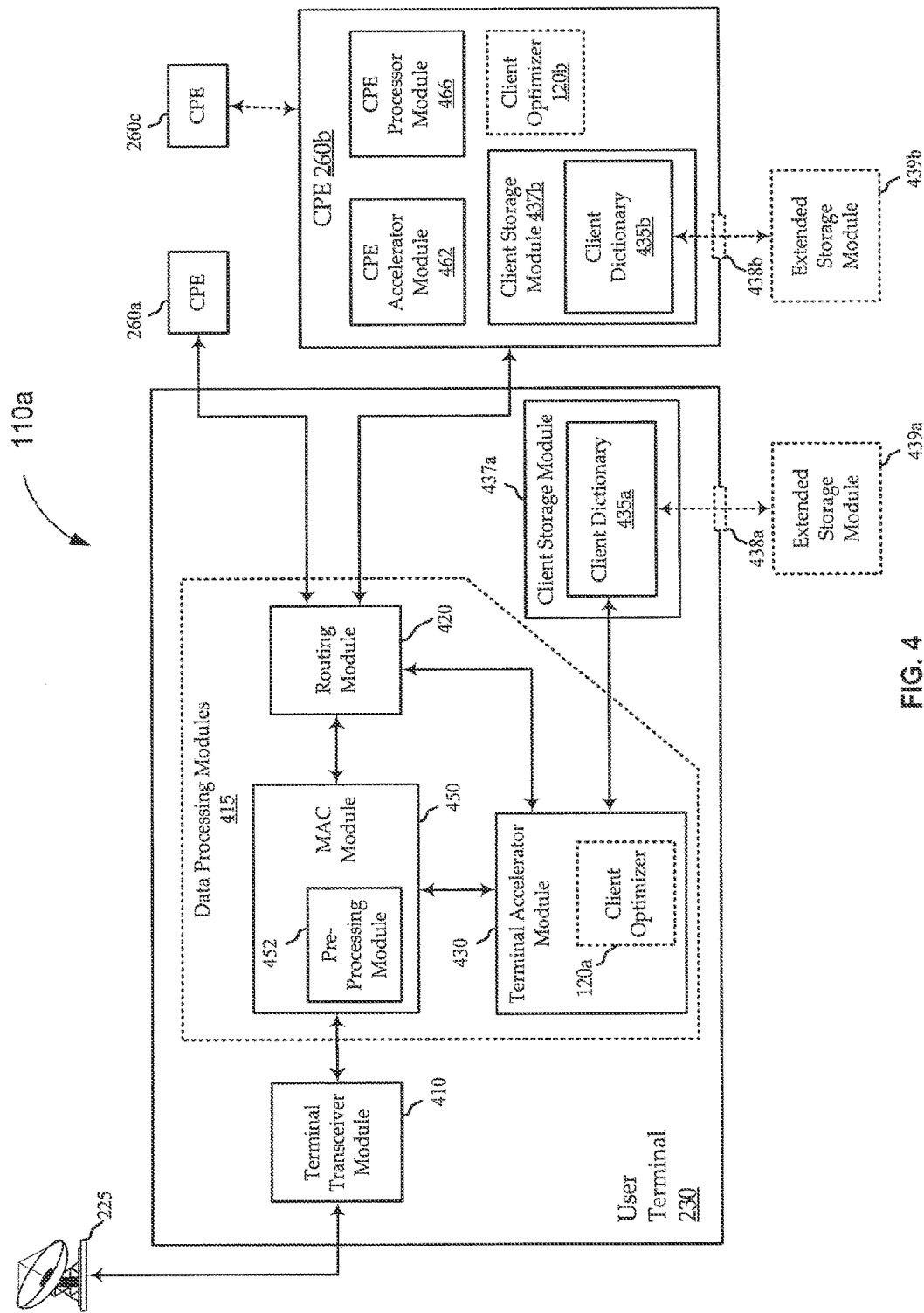
FIG. 4 shows a simplified block diagram of an embodiment of a user system, including an embodiment of a user terminal coupled between a user antenna and a CPE, according to various embodiments.

As described above (e.g., with reference to FIGS. 1 and 2), the server system 220 communicates with one or more user systems 110 configured to perform various user-side (e.g., client-side) communications functions. FIG. 4 shows a simplified block diagram of an embodiment of a user system 110a, including an embodiment of a user terminal 230 coupled between a user antenna 225 and a CPE 260, according to various embodiments. Some embodiments of the user system 110 are configured, as shown in FIG. 2, to communicate over a satellite communications system 200 by interfacing with a server system 220 over a satellite link (e.g., the server system 220 of FIG. 3). Interfacing and other functionality of the user system 110 may be provided by components of the user terminal 230, including a terminal transceiver module 410, data processing modules 415, and a client storage module 437. Embodiments of the data processing modules 415 include a MAC module 450, a terminal accelerator module 430, and a routing module 420.

The components may be implemented, in whole or in part, in hardware. Thus, they may include one or more ASICs adapted to perform a subset of the applicable functions in hardware. Alternatively, the functions may be performed by one or more other processing modules (or cores), on one or more integrated circuits. In other embodiments, other types of integrated circuits may be used (e.g., Structured/Platform ASICs, FPGAs, and other Semi-Custom ICs), which may be programmed. Each may also be implemented, in whole or in part, with instructions embodied in a computer-readable medium, formatted to be executed by one or more general or application specific processors.

A signal from the user antenna 225 is received by the user terminal 230 at the terminal transceiver module 410. Embodiments of the terminal transceiver module 410 may amplify the signal, acquire the carrier, and/or downconvert the signal. In some embodiments, this functionality is performed by other components (either inside or outside the user terminal 230).

In some embodiments, data from the terminal transceiver module 410 (e.g., the downconverted signal) is communicated to the data processing modules 415 for processing. For example, data is communicated to the MAC module 450. Embodiments of the MAC module 450 prepare data for communication to other components of, or in communication with, the user terminal 230, including the terminal accelerator module 430, the routing module 420, and/or the CPE 260. For example, the MAC module 450 may modulate, encode, filter, decrypt, and/or otherwise process the data to be compatible with the CPE 260.

In some embodiments, the MAC module 450 includes a pre-processing module 452. The pre-processing module 452 implements certain functionality for optimizing the other components of the data processing modules 415. In some embodiments, the pre-processing module 452 processes the signal received from the terminal transceiver module 410 by interpreting (e.g., and decoding) modulation and/or coding schemes, interpreting multiplexed data streams, filtering the digitized signal, parsing the digitized signal into various types of information (e.g., by extracting the physical layer header), etc. In other embodiments, the pre-processing module 452 pre-filters traffic to determine which data to route directly to the routing module 420, and which data to route through the terminal accelerator module 430 for further processing.

Embodiments of the terminal accelerator module 430 provide substantially the same functionality as the server-side accelerator module 350, including various types of applications, WAN/LAN, and/or other acceleration functionality. In one embodiment, the terminal accelerator module 430 implements functionality of AcceleNet™ applications, like interpreting data communicated by the server system 220 using high payload compression, handling various prefetching functions, parsing scripts to interpret requests, etc. In certain embodiments, these and/or other functions of the terminal accelerator module 430 are provided by a client optimizer 120 resident on (e.g., or in communication with) the terminal accelerator module 430. Notably, in some embodiments, the client optimizer 120 is implemented as client optimizer 120a on the user terminal 230 and/or client optimizer 120b on the CPE 260b. Data from the MAC module 450 and/or the terminal accelerator module 430 may then be routed to one or more CPEs 260 by the routing module 420.

In some embodiments, output from the data processing modules 415 and/or the terminal accelerator module 430 is stored in the client storage module 437a. Further, the data processing modules 415 and/or the terminal accelerator module 430 may be configured to determine what data should be stored in the client storage module 437a and which data should not (e.g., which data should be passed to the CPE 260). It will be appreciated that the client storage module 437a may include any useful type of memory store for various types of functionality of the user system 110. For example, the client storage module 437a may include volatile or non-volatile storage, servers, files, queues, etc. Embodiments of the client storage module 437a are configured to store some or all of a client dictionary 435, as described more fully below.

In certain embodiments, storage functionality and/or capacity is shared between an integrated (e.g., on-board) client storage module 437a and an extended (e.g., off-board) storage module 439a. For example, the extended storage module 439a may be implemented in various ways, including as an attached peripheral device (e.g., a thumb drive, USB hard drive, etc.), a wireless peripheral device (e.g., a wireless hard drive), a networked peripheral device (e.g., a networked server), etc. In some embodiments, the user terminal 230 interfaces with the extended storage module 439a through one or more ports 438a. In one embodiment, functionality of the client storage module 437 is implemented as storage integrated into or in communication with CPE 260 (e.g., as client storage module 437b in CPE 260b).

Some embodiments of the CPE 260 are standard CPE 260 devices or systems with no specifically tailored hardware or software (e.g., shown as CPE 260a). Other embodiments of the CPE 260, however, include hardware and/or software modules adapted to optimize or enhance integration of the CPE 260 with the user terminal 230 (e.g., shown as alternate CPE 260b). For example, the alternate CPE 260b is shown to include a CPE accelerator module 462, a CPE processor module 466, and a client storage module 437b. Embodiments of the client storage module 437b are configured to store some or all of the client dictionary 435b. Embodiments of the CPE accelerator module 462 are configured to implement the same, similar, or complementary functionality as the terminal accelerator module 430. For example, the CPE accelerator module 462 may be a software client version of the terminal accelerator module 430. In some embodiments, some or all of the functionality of the data processing modules 415 is implemented by the CPE accelerator module 462 and/or the CPE processor module 466. In these embodiments, it may be possible to reduce the complexity of the user terminal 230 by shifting functionality to the alternate CPE 260b.

Embodiments of the client storage module 437b may include any type of dictionary, object or byte caching, data serving, and/or other storage-related components in or in communication with the alternate CPE 260b (e.g., a computer hard drive, a digital video recorder ("DVR"), etc.). In some embodiments, the client storage module 437b is in communication with an extended storage module 439b, for example, via one or more ports 438b. Of course, many types of CPE 260 are possible, and the functionality of the CPE 260 may be implemented in a number of different types of devices or systems. In some embodiments, the CPE 260 is a fixed or mobile end device for displaying content to the user, like a television, personal computer, home theater system, cellular telephone, portable music or video player, personal digital assistant, etc. In other embodiments, the CPE 260 is an intermediate device, configured to communicate to another CPE 260 end device (or even to another CPE 260 intermediate device). For example, the CPE 260 may include a set-top box, a home networking component (e.g., a router, a hub, a femtocell, etc.), or any other type of intermediate device. As shown, CPE 260c is in communication with the user terminal 230 indirectly through CPE 260b, where CPE 260b is acting as an intermediate device.

Further, in some embodiments, the CPE 260 is integrated, partially or completely, with the user terminal 230. For example, a home theater system may be built around a main interface component that includes a network interface having user terminal 230 functionality, certain CPE 260 functionality, and ports for wired or wireless communication with additional CPE 260 devices. Embodiments of user terminals 230 and/or CPEs 260 may also be configured for compatibility with certain communication standards. For example, CPEs 260 may be configured to support plug-and-play functionality (e.g., through the Digital Living Network Alliance (DLNA) standard), wireless networking (e.g., through the 802.11 standard), etc.

In certain embodiments, the user terminal 230 is configured to transmit data back to the server system 220. Embodiments of the data processing modules 415 and the terminal transceiver module 410 are configured to provide functionality for communicating information back through the communications system (e.g., through the satellite communications system 200 of FIG. 2 for directing provision of services). For example, information about what is stored in the client dictionary 435 may be sent back to the server system 220 for limiting repetitious file transfers, as described more fully below.

It will be appreciated that the communications system may be used to provide different types of communication services to users. For example, the satellite communications system 200 of FIG. 2 may provide content from content servers 150, through the network 140, to a user's CPE 260, including Internet content, broadcast television and radio content, on-demand content, voice-over-Internet-protocol (VoIP) content, and/or any other type of desired content. It will be further appreciated that this content may be communicated to users in different ways, including through unicast, multicast, broadcast, simulcast, and/or other communications.

As described above, a number of additional and/or improved communications functions may be facilitated by exploiting content sharing and/or other types of opportunities through deltacasting. For example, in a typical communication system, like the satellite communications system 200 of FIG. 2, multiple customers may request the same or substantially similar content at the same or different times. By exploiting this feature of the communication system, it may be possible to optimize (at least partially) the provision of various communication services. For example, link conditions (e.g., bandwidth utilization) may be improved, enhanced services may be offered to customers, costs relating to service provision may be reduced, etc.

Content sharing may be implemented in many different ways, according to embodiments. For example, certain content may be multicast to a number of users in a spot beam, thereby allowing multiple user systems 110 to share channels (i.e., potentially increasing effective throughput). Rather than transmitting a copy of the content to each requesting user through a private unicast channel, fewer copies of the content may be shared by multiple users. In certain embodiments, custom or off-the-shelf components are used to provide this functionality by evaluating multiple communication streams and collapsing them into a single stream within some tolerance (e.g., a small "jitter window," accounting for inter-packet delay variances). In other embodiments, dedicated components in the server system 220 implement this functionality.

According to various embodiments, deltacasting and related functionality may be implemented at least partially through client-server interactions. As discussed above, a server optimizer 130 may determine what content is traversing the various links in the communication system using fingerprints. For example, the fingerprints may be used to identify fingerprint trends (e.g., patterns of byte-sequence communications) and/or to identify actual content features (e.g., information from layers 4-7 of the OSI IP protocol stack). These determinations may then be used to identify and exploit opportunities for improving the communication services over the communications system.

Figure 5:
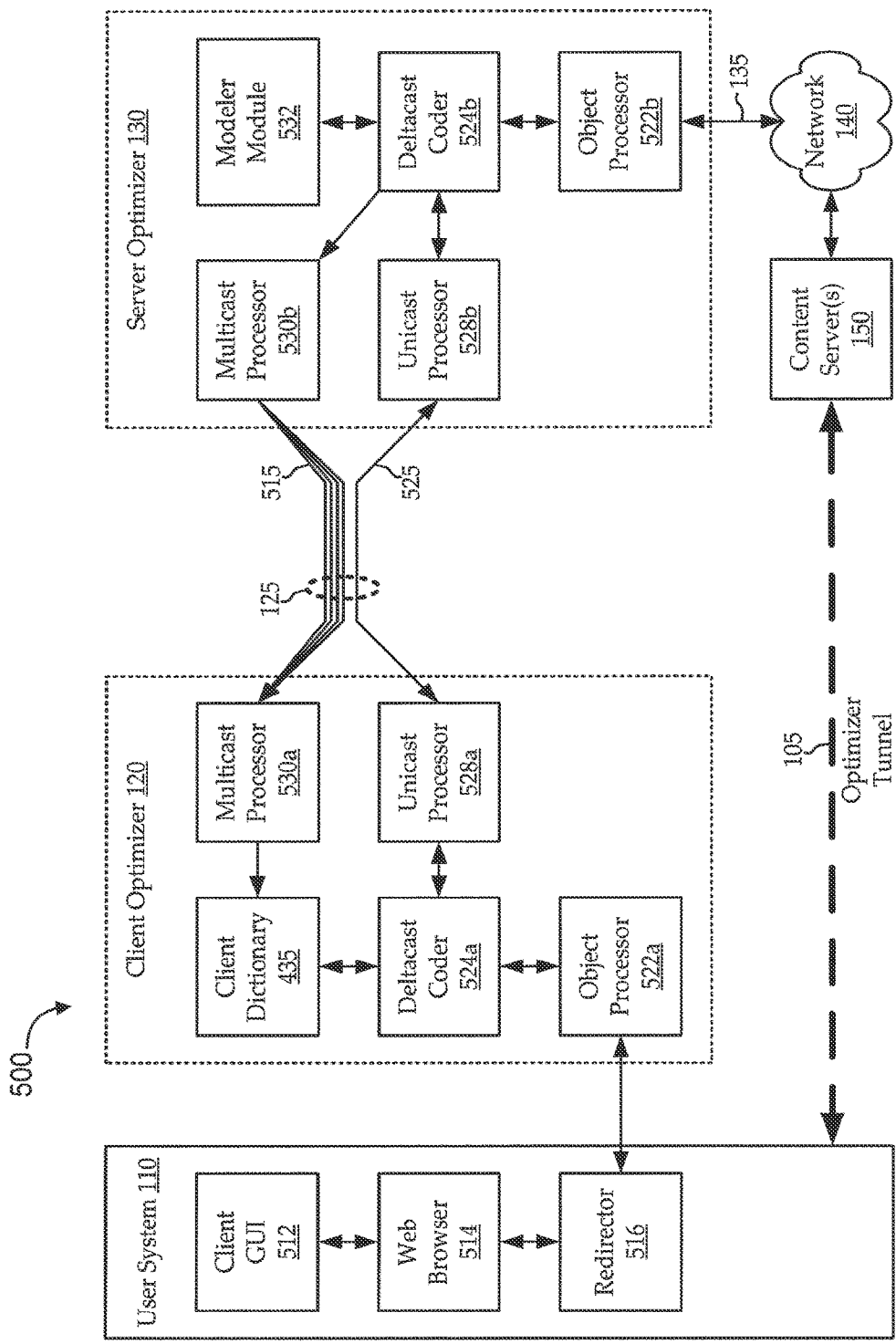
FIG. 5 shows a block diagram of an embodiment of a communications system, illustrating client-server interactivity through a client optimizer and a server optimizer, according to various embodiments.

FIG. 5 shows a block diagram of an embodiment of a communications system 500, illustrating client-server interactivity through a client optimizer 120 and a server optimizer 130, according to various embodiments. In some embodiments, the communications system 500 is an embodiment of the communications system 100a of FIG. 1A or the satellite communications system 200 of FIG. 2. As shown, the communications system 500 facilitates communications between a user system 110 and one or more content servers 150 via at least one client-server communication link 125 and at least one content network link 135. For example, interactions between the client optimizer 120 and the server optimizer 130 effectively create a tunnel 505 between the user system 110 and the content servers 150. In some embodiments, the content network link 135 includes links through a network 140, like the Internet. Also, as illustrated, embodiments of the client-server communication link 125 support one or more unicast service flows 525 and one or more multicast service flows 515.

In some embodiments, the user system 110 includes a client graphical user interface (GUI) 512, a web browser 514, and a redirector 516. The client GUI 512 may allow a user to configure performance aspects of the user system 110 (e.g., or even aspects of the greater communications system 500 in some cases). For example, the user may adjust compression parameters and/or algorithms, alter content filters (e.g., for blocking illicit websites), or enable or disable various features used by the communications system 500. In one embodiment, some of the features may include network diagnostics, error reporting, as well as controlling, for example, components of the client optimizer 120 and/or the server optimizer 130.

In one embodiment, the user selects a universal recourse locator (URL) address through the client GUI 512 which directs the web browser 514 (e.g., Internet Explorer®, Firefox®, Netscape Navigator®, etc.) to a website (e.g., cnn.com, google.com, yahoo.com, etc.). The web browser 514 may then issue a request for the website and associated objects (i.e., a content set) to the Internet. It is worth noting that the web browser 514 is shown for illustrative purposes only. While embodiments of the user system 110 may typically include at least one web browser 514, user systems 110 may interact with content providers 150 in a number of different ways without departing from the scope of the invention. Also, as discussed above, various types of content sets may be requested in various ways (e.g., feed links may be requested through feed readers, etc.).

The content set request from the user system 110 (e.g., from the web browser 514) may be intercepted by the redirector 516. It is worth noting that embodiments of the redirector 516 are implemented in various ways. For example, embodiments of the redirector 516 are implemented within a user modem as part of the modem's internal routing functionality. The redirector 516 may send the request to the client optimizer 120. It is worth noting that the client optimizer 120 is shown as separate from the user system 110 (e.g., in communication over a local bus, on a separate computer system connected to the user system 110 via a high speed/low latency link, like a branch office LAN subnet, etc.). However, embodiments of the client optimizer 120 are implemented as part of the user system 110 in any useful client-side location, including as part of a user terminal, as part of a user modem, as part of a hub, as a separate hardware component, as a software application on the client machine, etc.

In one embodiment, the client optimizer 120 includes an object processor 522a. The object processor 522a may be configured to perform a number of different processing functions, including Java parsing and protocol processing. Embodiments of the object processor 522a may process hypertext transfer protocol (HTTP), file transfer protocol (FTP), various media protocols, metadata, header information, and/or other relevant information from the request data (e.g., packets) to allow the client optimizer 120 to perform its optimizer functions. For example, the request may be processed by the object processor 522a to determine which objects are being requested and whether data needed to generate the requested object is already stored locally (e.g., from a prefetch operation, a pre-positioning operation, a multicast caching operation, a previous deltacasting operation, etc.). Various embodiments exploit byte sequences stored locally in the client dictionary 435. Certain embodiments may also exploit object data and/or other data stored locally (e.g., in browser cache, etc.), where appropriate.

In some embodiments, the object processor 522a sends the processed request data to a deltacast coder 524a. The deltacast coder 524a may encode the request into a compressed version of the request using one or more data compression algorithms. For example, these algorithms may employ dictionary coding with the client dictionary 435 configured to store strings so that data from previous web objects can be used to compress data from new pages. Of course, other types of coding are possible according to other embodiments of the deltacast coder 524a.

The processed and/or coded request data may then be further processed by a unicast processor 528a in some embodiments in preparation for communicating the data over the client-server communication link 125 (e.g., as private IP traffic). In various embodiments, the unicast processor 528a processes the data according to one or more protocols, for example a unicast protocol, depending at least on the type of communication links implemented as part of the client-server communication link 125. For example, the client-server communication link 125 may include a wireless link, a cellular link, a satellite link, a dial-up link, etc. In certain embodiments, the unicast processor 528a is configured to implement Intelligent Compression Technology's® (ICT) transport protocol (ITP). In one embodiment, ITP maintains a persistent connection between the client optimizer 120 and the server optimizer 130. The persistent connection may enable the communications system 500 to reduce or eliminate inefficiencies and overhead costs associated with creating a new connection for each request.

In some embodiments, the communication is received at the other end of the client-server communication link 125 by a unicast processor 528b in the server optimizer 130. In some embodiments, the unicast processor 528b in the server optimizer 130 is implemented as substantially an identical component to the unicast processor 528a in the client optimizer 120. In other embodiments, implementions of the unicast processors 528 may be tailored to their location (e.g., in the client optimizer 120 or the server optimizer 130). When the request data is received by the unicast processor 528b, the unicast processor 528b may process the request (e.g., as part of a content set, as discussed below) according to the applied one or more protocols. For example, the unicast processor 528b may be configured to implement ITP, such that data sent from the unicast processor 528a according to the ITP protocol can be processed accordingly.

As discussed above, the data received at the server optimizer 130 from the client optimizer 120 may be coded (e.g., dictionary coded) and/or otherwise processed (e.g., according to one or more protocols, like HTTP). Embodiments of the server optimizer 130 include an object processor 522b and a deltacast coder 524b. In some embodiments, the object processor 522b and the deltacast coder 524b are configured to handle processing and/or coding of the request data implemented by the object processor 522a and the deltacast coder 524a of the client optimizer 120, respectively. For example, embodiments of the object processor 522b use features of the deltacast coder 524b and/or dictionary types of information, which may be stored, or modeled, in a modeler module 532 to decode the request data. The request may thus be processed (e.g., translated, decoded, etc.) into a format that is accessible to a source of the requested content (e.g., a website). Of course, in certain embodiments, additional features of the request may be processed by these or other components. For example, if the request includes instructions (e.g., set-level metadata, a cookie, or a directive, such as a "referred by" or type of encoding accepted, etc.), information about the instructions may be stored as part of a model in the modeler module 532 or another location.

Embodiments of the object processor 522b may then forward the decoded request to an appropriate destination (e.g., a content server 150) over the content network link 135 (e.g., via a network 140). The content network link 135 may include, for example, a cable modem connection, a digital subscriber line (DSL) connection, a T1 connection, a fiber optic connection, etc. As discussed above, in some embodiments of the communications system 500, the content network link 135 manifests substantially lower latency than that of the client-server communication link 125.

Response data may be received by the object processor 522b, in response to the request, from the appropriate destination (e.g., the content server 150) over the content network link 135. It will be appreciated that the response data may include various types of information, such as one or more attachments (e.g., media files, text files, etc.), references to "in-line" objects needed to render a web page, etc. For example, as discussed above, the response data may be identified as part of a content set and handled as such. Embodiments of the object processor 522b may be configured to interpret the response data, which may, for example, be received as HTML, XML, CSS, Java Scripts, or other types of data. As described more fully below, a fingerprint of the response data may be generated by the deltacast coder 524b (e.g., using dictionary coding techniques) and used for various types of deltacasting and/or other optimization functions.

The fingerprint may be used to determine how to further handle the response data, as described below. In some embodiments, processed and/or coded (e.g., compressed) response data is sent over the client-server communication link 125 to the client optimizer 120. The data may be sent as a unicast service flow 525 from the unicast processor 528b in the server optimizer 130 to the unicast processor 528a in the client optimizer 120; and/or the data may be sent as one or more multicast service flows 515 from the multicast processor 530b in the server optimizer 130 to the multicast processor 530a in the client optimizer 120. In certain embodiments, standard protocols are adapted for use with the unicast service flows 525 and/or the multicast service flows 515. For example, the Pragmatic General Multicast ("PGM") protocol, the Negative-Acknowledgment ("NACK") Oriented Reliable Multicast ("NORM"), or "RFC 3940," protocol from the Internet Engineering Task Force ("IETF"), or other protocols may be used to implement multicasting.

Further, when the client-server communication link 125 includes multiple multicast service flows 515, the multicast service flows 515 may be configured in various ways. In various embodiments, for example, the multicast service flows 515 are configured to each communicate at a different modcode point, on a different spot beam, and/or on a different carrier. This may allow for more efficient communication of traffic to groups of user systems 110 having particular characteristics. For example, if certain traffic is determined to be destined for a user system 110 capable of communicating at a particular modcode point, the traffic may be multicast on a multicast service flow 515 that operates at or near this modcode point for maximum efficiency (e.g., rather than at the lowest modcode point needed to transmit to all user systems 110 in the multicast group). While this may, in certain cases, cause some of the user systems 110 in the multicast group to be unable to reliably receive all the multicast data, there may still be an overall improvement in the operation of the communications system 500.

In other embodiments, modcodes may be handled (e.g., selected, adapted, optimized, etc.) for various effects. In one embodiment, as described above, the modcode is selected according to link conditions between the server optimizer 130 and the client optimizer 120 associated with a requesting client, if any (i.e., so that at least the requesting client can reliably receive the communication). In another embodiment, the modcode is selected so that at least some threshold group (e.g., number) of clients can reliably receive the communication. In still other embodiments, the modcode is adapted to changes in link conditions between the server optimizer 130 and one or more client optimizers 120. For example, adaptive coding and modulation techniques may be used. The modcode may be adapted by estimating or monitoring link conditions from the server-side (e.g., estimating signal-to-noise ratios, bandwidth, etc.) or via feedback from the client-side. In one embodiment, the client optimizer 120 communicates information, like whether packets are reliably received, as feedback to the server optimizer for dynamically adjusting the modcode.

The data received at the client optimizer 120 from the server optimizer 130 may be coded (e.g., dictionary coded) and/or otherwise processed (e.g., according to one or more protocols, like HTTP). Embodiments of the object processor 522a and the deltacast coder 524a in the client optimizer 120 are configured to handle processing and/or decoding of the response data, respectively. For example, embodiments of the object processor 522a use features of the deltacast coder 524a, including functionality of the client dictionary 435, to decode the response data. Embodiments of the object processor 522a may then forward the decoded response to the user system 110 (or to other components of the user system 110, where the client optimizer 120 is part of the user system 110). The response may then be used by components of the user system 110. For example, a media object received as part of the response data may be played back through a media player at the user system 110, used to render a web page through the client web browser 514, etc.

It will be appreciated that, while the above description focuses on browser requests and responses to those requests, embodiments of the invention function within many other contexts. For example, embodiments of the communication system 500 are used to provide interactive Internet services (e.g., access to the world-wide web, email communications, file serving and sharing, etc.), television services (e.g., satellite broadcast television, Internet protocol television (IPTV), on-demand programming, etc.), voice communications (e.g., telephone services, voice-over-Internet-protocol (VoIP) telephony, etc.), networking services (e.g., mesh networking, VPN, VLAN, MPLS, VPLS, etc.), and other communication services. As such, the "response" data discussed above is intended only as an illustrative type of data that may be received by the server optimizer 130 from a content source (e.g., a content server 150). For example, the "response" data may actually be pushed, multicast, or otherwise communicated to the user without an explicit request from the user.

For illustrative purposes, traffic over the communications system 500 may be categorized into private-interest traffic and public-interest traffic. Private-interest traffic may include any traffic for which multicasting the traffic to multiple user systems 110 is deemed inefficient. For example, where the traffic is of interest to only one user system 110, or a very small number of user systems 110, it may cost more to set up and process a multicast service flow than to simply unicast the traffic to each interested user system 110. Notably, a user system 110 may act as an intermediate node (e.g., a hub, switch, router, etc.) that forwards information to multiple end users. For example, in a LAN, data may be received at the client-side for all computers in the LAN by a switch, which may then forward the data to appropriate users in the LAN; traffic that is of interest to only one user system 110 may, in fact, be of interest to many users within a LAN serviced by the one user system 110. Alternatively, each user in the LAN may be considered a separate user system 110 running a separate client optimizer 120. As such, the relevant determination may be, from the perspective of the server optimizer 130, how many unicast service flows 525 on the client-server communication link 125 would be needed to unicast the data to all interested users. In contrast to private-interest traffic, public-interest traffic may include any traffic for which multicasting the traffic to multiple user systems 110 is deemed more efficient than unicasting the traffic to each interested user system 110.

Notably, a number of types of traffic may be either private-interest traffic or public-interest traffic, depending on the context. One example is control traffic, which may be used for various types of control of the communications system. For example, control traffic may be used to send control signals to the client optimizer 120 to direct the client optimizer 120 to accept a particular multicast service flow 515. In one embodiment, individual control traffic is sent as unicast service flows 525 to particular client optimizers 120. In another embodiment, certain control traffic is sent to groups of client optimizers 120 (e.g., to some or all of the user systems 110 serviced by a particular spot beam of a satellite communications system) as one or more multicast service flows 515.

Another type of traffic that may be either private-interest traffic or public-interest traffic is media object data. In one embodiment, a first user takes video with a digital camera as part of a videoconference with a second user. The video file may be considered private-interest traffic, as it may be of interest only to the recipient and may never be requested, or even be made accessible, to other users on the communications system 500. In another embodiment, a reporter for CNN takes video with a digital camera as part of a live feed to CNN.com. The video file may be considered public-interest traffic, as it may be accessed by thousands of users on the communications system 500.

Of course, the determination of whether to classify traffic as private-interest traffic or public-interest traffic can be made in a number of ways and may involve many factors. The factors used to make the determination may be derived from the traffic itself or from other sources (e.g., from an evaluation of current link conditions or current system usage, from third-party information, etc.). When analyzing the traffic itself, information may be derived from the header portion and/or the content portion of the datagrams. As noted above, the header portion may provide straightforward sources of information about the communication and/or the content of the communication (e.g., through protocol information, metadata, public or proprietary tags, etc.). However, the information from the header portion may often be limited from the perspective of a man-in-the-middle type of server optimizer 130. For example, relevant header information may be encoded in a proprietary format, may be misleading as to the underlying by sequence, etc.

The content portion of the traffic received at the server optimizer 130 includes the actual objects (e.g. content file data) being sent to users via respective user systems 110. It will be appreciated that it may be difficult or impossible to obtain certain types of information looking only at the content portion of the traffic datagrams. Of course, various types of data processing (e.g., statistical analysis) can be used to derive information from the byte sequence, but it may be difficult to derive high-level information, such as the file type associated with the data. For example, a movie is streamed from a VOD server (e.g., as the content server 150) to a user terminal 110. Proprietary tags in the header portion of the traffic may indicate the name of the movie and the file type for processing at the user's playback device, while the content portion may include only the sequence of bytes that define the actual movie content. When the streaming traffic is intercepted by the server optimizer 130, the server optimizer 130 may be unable to read the header portion of the traffic, and may, therefore, be unable to use that information for making multicast and/or other determinations.

Notably, however, there are many cases when requests and/or responses can be characterized and handled at a set level, for example, according to a Content Set identifier and set-level metadata. Set-level handling may allow embodiments to perform certain high-level functions with content traffic, even while acting as a substantially transparent optimizer. For example, certain traffic optimizations (e.g., pre-positioning determinations) may be implemented according only to byte-level content portion data, while allowing certain high-level functionality to be implemented according to set-level characterizations.

Figure 6:
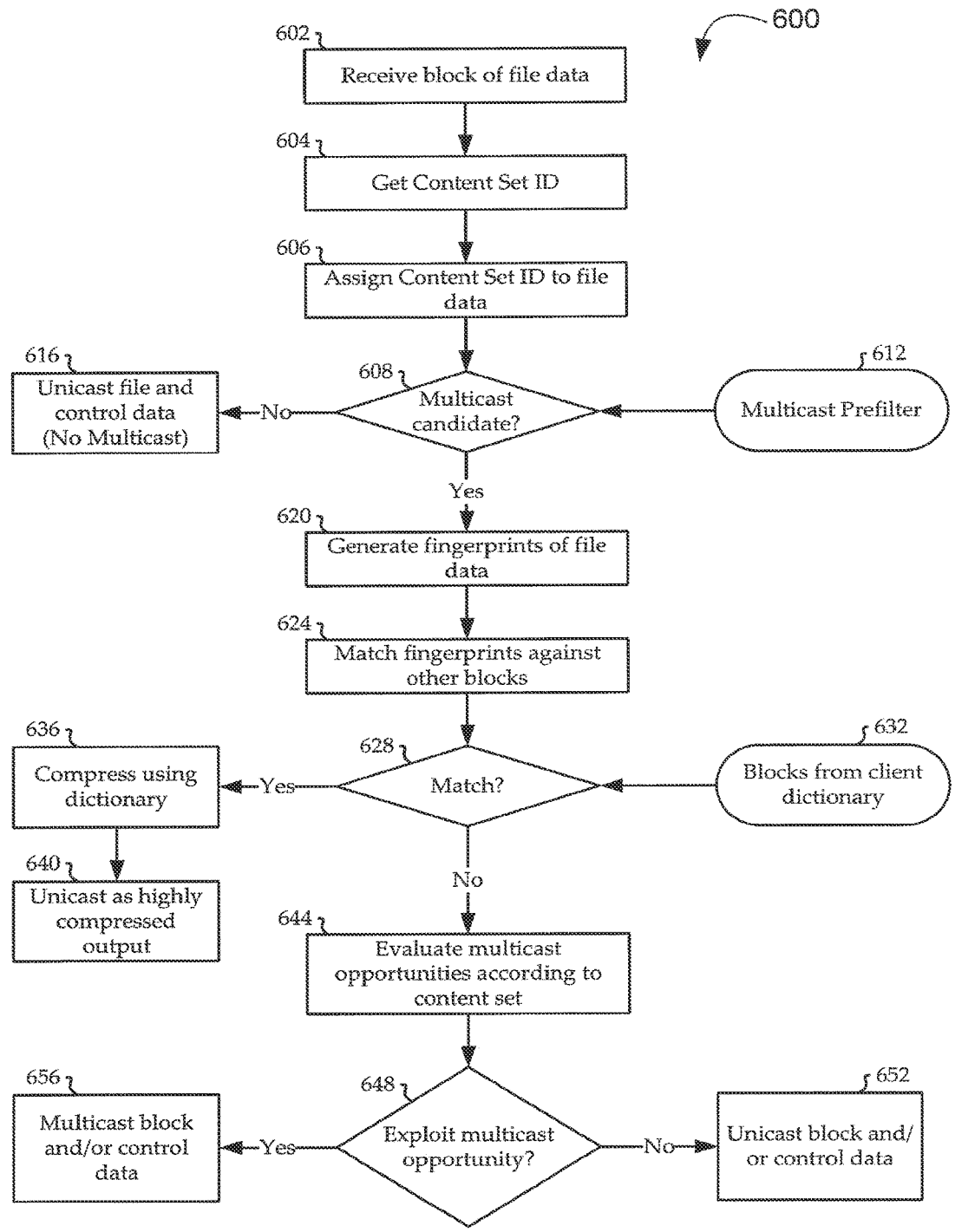
FIG. 6 is a flow diagram of an illustrative method for using deltacasting to handle content set traffic over a communications system, according to various embodiments.

FIG. 6 is a flow diagram of an illustrative method 600 for using deltacasting to handle content set traffic over a communications system, according to various embodiments. For the sake of clarity, the method 600 is described in the context of the communications system 500 of FIG. 5. It will be appreciated, however, that various modifications may be made to the communications system 500 without limiting the scope of the method 600.

Embodiments of the method 600 begin at block 602 by receiving a block of content data. For example, the content data block (e.g., file data, streaming data, web object data, etc.) may be received as part of traffic intercepted by the server optimizer 130 from a content server 150 over the content network link 135. In some embodiments, the content data block is identified as part of a content set. Where the content data block is part of a content data set, the method 600 may get an appropriate content set identifier ("Content Set ID") in block 604. The Content Set ID may then be assigned to the block of data in block 606. Of course, there may be many ways to identify data as part of a content set and to get and assign an appropriate Content Set ID, according to various embodiments.

In one set of embodiments, pre-positioning routines are initiated (e.g., each night at 2:00 am, when a certain level of under-subscription or excess capacity of a communication link is detected, etc.), whereby one or more session streams may be established to communicate particular content sets. Each session stream may carry a Content Set ID, and all content set traffic being communicated over the session stream may be tagged with the Content Set ID. For example, in one embodiment, a list of feeds (e.g., RSS feeds) are identified as having popular content, and updates to these feeds are pushed to all interested clients (e.g., users that have subscribed to the feeds) overnight. Each night, a number of session streams are created to push the feed updates, and each feed update carries a Content Set ID (e.g., generated and/or provided as part of the pre-positioning routine). All file data received as part of each session stream may be assumed to relate to the requested content set, and all the file data received on the session stream can be associated with the session stream's Content Set ID.

In another set of embodiments, set-level handling is invoked as a result of a client-side request. A user may request a content set by sending a request to a content server 150. For example, the user may request a URL through the web browser 514, request a feed item through a feed reader, etc. The request may be intercepted by the client optimizer 120 and identified (e.g., tagged) as a content set request. When a session stream is established to handle the request (e.g., to communicate response data to the user in response to the user's request), the session stream may be configured to assign a particular Content Set ID to all its response data traffic received at block 602.

In various embodiments, the Content Set ID may be generated and/or assigned to the session stream at either the client side or the server side. For example, the server optimizer 130 may be configured to assign the Content Set ID according to a directive from the client optimizer 120 that carries the Content Set ID. Alternatively, the server optimizer 130 may determine that the request is for a content set and assign a Content Set ID, accordingly.

In yet another set of embodiments, set-level handling is invoked as a result of server-side determinations. For example, the server optimizer 130 may maintain a list of popular content sets. When a request for the content set is received at the server optimizer 130, a session stream may be established and an appropriate Content Set ID may be assigned. For example, a request is received for the homepage of a popular news website that is constantly updated throughout the day, such that the response data will include the most up-to-date version of the homepage and its associated content objects (the content set). The server optimizer 130 may establish a session stream and associate all the response traffic on the session stream with a Content Set ID (e.g., and additional metadata) that characterizes the data as part of the content set.

In some embodiments, the server optimizer 130 determines that some or all of a content set is being requested according to fingerprints of the data generated at block 620, as described below. For example, the fingerprint of a received data block may be analyzed by a content set referrer (e.g., compared against a global content set fingerprint list) to determine that the received data block is part of a content set. The data block may accordingly be tagged with an appropriate Content Set ID.

It will be appreciated that other ways of handling Content Set IDs are possible, according to other embodiments. Further, embodiments also associate set-level (e.g., URL-level, feed item level, feed channel level, etc.) metadata with the session stream data and/or with the Content Set ID. For example, each data block may be tagged at the server optimizer 130 with certain set-level metadata indicating its association with the content set for appropriate handling by the client optimizer 120. Alternatively, the Content Set ID may be associated with particular set-level metadata, and the client optimizer 120 may handle all data received on the associated session stream according to that set-level metadata.

As used herein, "set-level metadata" includes any type of set-level characterization information. For example, set-level metadata may be implemented as HTTP metadata inserted into the header portion of packets being received on a session stream, as entries in an associative database that indexes received data blocks and associates them with characterization information, etc. Embodiments can use the set-level metadata to perform certain high-level functions on the data and to affect multicasting and/or other determinations, while otherwise handling the received file data at the byte level (e.g., without the use of the file metadata), as described below. For example, the content set can be handled as such, even while treating the received blocks of file data as substantially meaningless sequences of bytes.

It is worth noting that some content set requests may not invoke set-level handling. Rather, set-level handling may be restricted to cases where it is deemed efficient to handle the request and resulting response data as part of a content set. In some embodiments, a list of popular content sets (e.g., and associated Content Set IDs) is maintained at the server-side and/or the client-side of the communications system 500. In other embodiments, various types of metrics are maintained to determine whether a requested content set is popular enough to warrant assigning a Content Set ID and handling the data as such. In still other embodiments, other types of cost-benefit analyses are performed to determine whether to invoke set-level handling. As such, discussions herein of determining that data is part of a content set may be assumed in cases where the data is determined to be part of a content set for which set-level handling is invoked.

Further, when the response data is not part of a content set (e.g., or not part of a content set determined to invoke set-level handling), the data may be handled in various ways, according to various embodiments. In one embodiment, no Content Set ID is received or assigned at blocks 604 and 606, respectively. In another embodiment, one or more types of Content Set ID are assigned to designate the data block as not part of a content set (e.g., or, more accurately, as part of a category of content for which set-level handling is not invoked). In still other embodiments, the method 600 is invoked only after set-level handling has been invoked. For example, the method 600 begins at block 602 only after a session stream has been established for a content set, when the request is made by a special pre-positioning client (e.g., as described above), etc.

Even further, before, during, and/or after the Content Set ID is received and assigned at blocks 604 and 606, respectively, some embodiments may determine whether the content data block is a multicast candidate at block 608. The determination in block 608 may be made as a function of one or more criteria used to define a multicast prefilter 612. In one embodiment, the determination is made by the object processor 522*b*.

The multicast prefilter 612 may be defined according to any type of multicast or similar filtering criteria known in the art. In one embodiment, the multicast prefilter 612 is based on the file size of the content data block. For example, only files larger than a certain minimum size may be considered for multicasting. In another embodiment, information from the header portion of the traffic is used by the multicast prefilter 612. For example, the multicast prefilter 612 may be defined to make the initial multicast determination in block 608 according to source IP address, host URL, destination IP address, file type, protocol, HTTP metadata, etc. For example, all video files over a certain size coming from YouTube.com may be considered multicast candidates, while video files being sent as an email attachment to a single recipient may not be considered multicast candidates.

In some embodiments, data relevant to the multicast prefilter 612 is enhanced through trusted source relationships. For example, contractual relationships may be formed with content and service providers to allow visibility by the service providers into the content traversing the network. Embodiments of the trusted source relationships include access to encryption keys (e.g., including master keys), authorization to re-serve or re-host content (e.g., through a mirroring relationship as described more fully below), etc. In the context of these relationships, the server optimizer 130 may be able to use certain types of proprietary metadata to make initial multicasting determinations.

Of course, the determination made in block 608 may or may not relate to whether the received content is part of a content set. In one example, the file data may be associated with a Content Set ID in block 606 and then determined in block 608 to be part of a file that is too small to be worth multicasting. In another example, for example where substantial processing is needed to determine whether received data is part of a content set, the determination in block 608 may be used to pre-filter received data prior to making the content set determination (e.g., prior to receiving and assigning the Content Set ID in blocks 604 and 606, respectively).

When it is determined at block 608 that the content data block is not a multicast candidate, at block 618, the content data block (e.g., or at least a portion of the content data block) may be unicast, along with any relevant control data, to the appropriate user system(s) 110. For example, as described above, the content data block may be processed by the object processor 522*b* and/or the deltacast coder 524*b*, and sent as a unicast service flow 525 over the client-server communication link 125 via the unicast processors 528. The data may then be received by the client optimizer 120, processed and/or decoded, and forwarded, as appropriate, to components of the user system(s) 110.

When it is determined at block 608 that the content data block is a multicast candidate (e.g., according to the multicast prefilter 612 criteria), the content data block is further processed by the server optimizer 130 to determine if any or all of the content data block will, in fact, be sent over one or more multicast service flows 515. At block 620, a fingerprint is generated (e.g., a fingerprint is calculated). In some embodiments, the fingerprint is generated at block 620 by the deltacast coder 524b of the server optimizer 130.

In certain embodiments, the fingerprint is generated using cryptographic hash functions (e.g., generated by a Message-Digest algorithm 5 (MD5) technique), non-secure hash functions (e.g., generated by a cyclic redundancy check (CRC) technique), or other similar techniques. In other embodiments, the fingerprint can be generated in any way, such that the resulting fingerprint can be used to indicate that one particular byte sequence (or a portion of the byte sequence) matches another particular byte sequence (e.g., or a portion of another byte sequence). Embodiments of dictionary coding (e.g., particularly delta coding) and related techniques are described in more detail in U.S. patent application Ser. No. 12/477,814, entitled "METHODS AND SYSTEMS FOR UTILIZING DELTA CODING IN ACCELERATION PROXY SERVERS" (026841-002110US), filed on Jun. 3, 2009, which is incorporated herein by reference for any and all purposes.

In some embodiments, the fingerprint is essentially a compressed version of the byte sequence. In other embodiments, the fingerprint is a checksum, hash, or other technique applied to some or all of the object data. For example, in one embodiment, a checksum of the first megabyte of data in the byte sequence is used as a fingerprint. This fingerprint may then be compared to other fingerprints to find a match. Notably, embodiments may ultimately seek multicast opportunities and/or other opportunities for optimization of the communications system 500. As such, it may be inefficient to generate fingerprints on very small blocks of data (e.g., at high densities), since it may not be efficient to exploit opportunities where only small blocks are identified as matches. Further, decreasing the size of blocks may increase the size of the dictionary. Some embodiments, therefore, generate fingerprints at a particular density determined to be efficient according to parameters of the communications system 500 or types of data.

It is worth noting that the traffic may include more than just the content data block for which a fingerprint is being generated, or the traffic may include multiple different content data blocks for which fingerprints are generated. In one example, a media file is received at the object processor 522b of the server optimizer 130. The object processor 522b and/or the deltacast coder 524b may strip off data (e.g., header information) that is not needed for generating the fingerprint at block 620. In another example, an email is received having the media file as an attachment. The object processor 522b and/or the deltacast coder 524b may perform an extra step of stripping off the email data, in addition to the header and other data, to effectively isolate the byte sequence for fingerprint generation at block 620. Of course, as described above, some embodiments may take steps to maintain the relationship between the byte sequence and the content set, even while other types of information are stripped off.

In block 624, the fingerprint is matched against other fingerprints of other content data blocks in the communications system 500. Determining which other content data blocks are "in the communications system 500" may include different types of analyses for different use cases. For example, in one embodiment, it is desirable to know whether the fingerprint indicates a matching content data block already stored at a particular user system 110 (e.g., in the client dictionary 435, etc.). In another embodiment, it is desirable to know whether the fingerprint indicates a matching data block currently being communicated over a unicast service flow 525 or one or more multicast service flows 515. In various embodiments, the modeler module 532 in the server optimizer 130 is configured to store models that may be useful for making various determinations (e.g., models of client dictionaries 435, models of server-side caches or dictionaries, models of past and current streams sent as either unicast service flows 525 or multicast service flows 515, etc.).

It will be appreciated that a number of different types of determinations may be made, depending on which blocks are being evaluated to find a match, each opening up potential deltacasting opportunities. One such determination is made in some embodiments in block 628, where the fingerprint of the content data block generated in block 620 is compared with blocks from the client dictionary model 632 to determine whether there is a match. For example, embodiments of the client dictionary 435 in the client optimizer 120 represent what is stored at a particular client (e.g., at a user system 110), and embodiments of the modeler module 532 at the server optimizer 130 store a model of the each client dictionary 435. If the content data block is destined for a particular client, the server optimizer 130 may use the model of the respective client dictionary 435 stored in the modeler module 532 to look for matches.

If a match is identified, this indicates that the byte sequence (or the portion of the byte sequence) is already stored local to the client (e.g., in the client's client dictionary 435). In that case, at block 636, all or relevant portions of the content data block may be compressed using the dictionary model (e.g. dictionary indexes). At block 640, the highly compressed version of the content data block may then be unicast to the client. In some embodiments, the content data block is compressed by the server-side deltacast coder 524b and communicated as a unicast service flow 525 to the client optimizer 120 via the unicast processors 528.

If no match is found at block 628, one or more types of multicast opportunities are evaluated at block 644. Notably, even when no match is found at block 628, a number of features of the data may be known. For example, it may be assumed, according to blocks 604 and 606, that the data is part of a content set and associated with a Content Set ID. It may be further assumed, according to block 628, that the data does not match data already stored in one or more client dictionaries 435. Based on these assumptions, the data may be assumed to be public-interest content (e.g., as described above) that has not yet been multicast to potentially interested users. Further, according to block 608, the data may already have been determined to be a multicast candidate according to the multicast pre-filter 612, which may constitute at least an initial indication that it would be efficient to multicast the data (e.g., barring other information, such as finding of a match at block 628).

For these and/or other reasons, some embodiments of the method 600 may consider the data to be multicastable without any further analysis. For example, based on the above assumptions, it is determined to be efficient enough to consider the data multicastable without evaluating any further opportunities or information in block 644. Alternatively, embodiments use the evaluations in block 644 to further refine the determination of multicastability of the data. In one embodiment, as described above, all data received at block 602 is assigned a Content Set ID at block 606, even when the Content Set ID sometimes indicates that the data should not be handled at the set level. In block 644, it may be determined that data carrying a Content Set ID that indicates no set-level handling should be handled as unicast data.

Of course, even where it is determined that the data is multicastable, there may still be reasons not to multicast the data or to affect how the data is multicast. As such, when multicast opportunities are evaluated in block 644, a determination may be made at block 648 as to whether multicast opportunities exist and if they should be exploited. For example, even where a multicast opportunity exists, it may be inefficient to spend the resources to exploit the opportunity (e.g., to set up a multicast service flow 515). In one embodiment, the communications system 500 has limited multicast capacity (e.g., a limited number of available multicast service flows). The determination in block 648 may account for the availability of multicast service flows, including, for example, whether it is possible to use up one of the available service flows (or whether it is efficient to use the flow for this traffic at the expense of taking multicast capacity away from other traffic). In another embodiment, the Content Set ID is evaluated in block 648 to determine an appropriate multicast group (e.g., a group of potentially interested users) for the content set. Based on one or more factors (e.g., modcode point(s) needed for reliable multicasting to the multicast group), the data may be unicast, communicated over multiple unicast and/or multicast service flows, etc. to optimize forward-link capacity sharing.

Further, multicast opportunities may be evaluated and fingerprint generation can be tailored in various ways depending on the types of opportunities being evaluated (e.g., the fingerprint may, itself, be a sequence of bytes or part of a more complex system of determining the associated byte sequence). By way of example, the fingerprints may be used in the context of identifying multicast opportunities with current service flows (e.g., to see if content requested by one user is currently being unicast or multicast to other users). To facilitate this type of identification, one embodiment generates maps having keys being the various fingerprints identifying the content data block and payloads that provide data about transfers underway or other useful information.

In certain embodiments, the maps are kept to a reasonable size to avoid unnecessary processing of data. For example, techniques are used to restrict the cases where the fingerprint is added to the map. In one embodiment, protocols that are "uninteresting" are excluded. For example, fingerprints may be created only for protocols known (e.g., predetermined) to be interesting, such as HTTP, certain media download protocols, etc. (e.g., as prefiltered in block 608). In another embodiment, small objects are excluded, as described above with reference to block 608. For example, if the size of the requested object is known (or predictable) in advance, it may be used as a filter—if the object is smaller than some threshold size, the fingerprint is not added to the map. When the object size is unknown (or not practically predictable), embodiments may wait until at least a minimum amount of data has been received, then filter out the noise (e.g., very small objects). Of course, it may be important to avoid delaying the map entry too long, such that it would cause the optimizer to miss a certain match with a new download. In some embodiments, when the download is complete, the fingerprint is removed from the map.

If a determination is made at block 648 that either no multicast opportunities exist, or that the multicast opportunities should not be exploited, the content data block data and/or any related control data is unicast at block 652, where appropriate. In some embodiments, unicasting the data at block 652 involves communicating the data as a unicast service flow 525 to the client optimizer 120 via the unicast processors 528. If a determination is made at block 648 that a multicast opportunity exists and should be exploited, the content data block may be multicast to one or more clients at block 656 (e.g., all users subscribing to a feed, all users deemed to be potentially interested in the content, all clients sharing the forward link, etc.). In some embodiments, multicasting the data at block 656 involves communicating the content block data over one or more multicast service flows 515 to the client optimizer 120 via the multicast processors 530.

In certain embodiments, the fingerprint generated in block 620, or another representation of the data (e.g., the byte sequence itself, a compressed version or a portion of the byte sequence, or a different types of fingerprint) is stored at the server-side for later use by the communications system 500. For example, storage of relevant information may be useful in generating or identifying future multicast opportunities, tracking and/or characterizing network usage, prefetching, etc. Further, embodiments may store the Client Set ID and/or may store the data representation in association with the Client Set ID.

It will be appreciated that, in some embodiments, multicasting or unicasting data is implemented in different ways. For example, in the satellite communications system 200 of FIG. 2, some or all of the receivers (e.g., user systems 110) in a spot beam 235 may inherently be capable of receiving at least a portion of any traffic being sent over the spot beam 235 by virtue of being tuned to the appropriate carrier, able to receive data at the current modcode point, etc.; effectively, the satellite communications system 200 broadcasts everything over the air. As such, as discussed above with reference to FIG. 1B, unicasting or multicasting to one or more user systems 110 may, in fact, involve broadcasting the data over the satellite link and also broadcasting control data to direct receivers to either accept or ignore relevant portions of the broadcast data.

In one illustrative embodiment, it is determined that content requested by one user has a high probability of being accessed by a group of non-requesting users sharing a satellite spot beam on the communications system 500 (e.g., because it is part of a popular content set). The content is broadcast over the satellite link with a stream identifier that designates it as a multicast stream. The stream identifier may be the same as or different from the Content Set ID. Control data is also sent directing user systems 110 associated with the interested users to "listen" to the multicast stream (e.g., to accept, rather than ignore, data with that stream identifier as it is received). In effect, this creates a multicast group of the interested users. In different embodiments, the control data may be communicated to the multicast group either as respective unicast service flows 525 to each client via the unicast processors 528 or as part of a multicast control channel sent over a multicast service flow 515 via the multicast processors 530. It will be appreciated that, for the sake of bandwidth efficiency, embodiments typically send the control data over the multicast control channel. For example, all the user systems 110 may be constantly listening to the multicast control channel to find out (e.g., among other things) which streams they should accept. Of course, other implementations are possible according to various embodiments for unicasting or multicasting the data over various unicast service flows 525 and/or multicast service flows 515 to the client optimizer(s) 120.

Once the data is received at the client optimizer 120, it may be stored at the client-side (e.g., blocks of the data may be stored and indexed by the client dictionary 435). In certain embodiments, storage in the client dictionary 435 ultimately causes a record of the data to be reflected at the server optimizer 130 if a model of the client-side client dictionary 435 is updated (e.g., through synchronization of the modeler module 532). When it is determined in block 648 that the data will be multicast in block 656 (e.g., and/or when the data is determined to be unicast in block 652), the data may be compressed and/or otherwise coded before it is sent over the client-server communication link 125. In one embodiment, the data is zip coded prior to being sent over the client-server communication link 125. When the zipped data is received at the client optimizer 120, the data is added to the client dictionary 435.

It is worth noting that the use of fingerprinting (e.g., and/or other dictionary coding techniques) to make multicasting and related determinations may provide a number of features. One feature is that deltacasting opportunities may be identified and/or exploited even where there is little or no access to certain metadata. For example, as discussed above, the server optimizer generates signatures based on byte level data and does not require knowledge of "header portion" information (e.g., file types, proprietary tags, protocol tags, etc.) to make its determinations.

Another feature is that fingerprinting techniques may allow deltacasting opportunities to be identified, even where the content source or other "header portion" (e.g., metadata) information is different. For example, say viewers are watching the same television show at the same time from different sources (e.g., different television channels are broadcasting the same content, different websites are mirroring the same content, etc.). Fingerprinting techniques can find matching blocks, as the blocks will match even where the content sources are different. Similarly, deltacasting opportunities may be identified even where cache-busting, anonymizer, spoofing, mirroring, and/or other techniques are used (e.g., to alter URLs, to implement content data network (CDN) functionality, etc.).

Still another feature is that deltacasting techniques may be used transparently to preserve communications from the perspective of end users and content sources. In particular, an end user and a content source may effectively experience the same byte-for-byte communications with or without deltacasting. For example, even though requests and/or responses are intercepted according to deltacasting embodiments, when a user requests data from a content source, the content source may ultimately provide the same bytes to the end user as if there were a unicast link between the end user and the content source.

It is also worth noting that embodiments allow substantially transparent optimization of communications while preserving certain legal and business relationships, including, copyright, digital rights management, subscription, and/ or other obligations. For example, as discussed above, content data is stored in dictionaries effectively as dissociated blocks of data, such that the content can only be recreated from those blocks using appropriate dictionary references (e.g., indexes). According to various embodiments, those dictionary references are unavailable to clients without a new request from the content source.

In one illustrative embodiment, a first user watches a movie through a popular video-on-demand website by logging into the website using credentials (e.g., a user name and password) and viewing the movie through an embedded player surrounded by banner advertisements. Based on one or more determinations discussed above, the content set for the website is multicast to the first (requesting) user and to a second (non-requesting) user, and is stored in the second user's client dictionary 435. The second user's client dictionary 435 may now include data blocks from a movie that includes copyrighted material, from a web session authenticated according to another user's credentials, from advertisements that may be cycled and/or tracked, from web objects that are designated in metadata as "un-cacheable" etc. As discussed above, embodiments of the client dictionary 435 store the data blocks in such a way that it may be effectively impossible for the first user to access the movie content directly from the client dictionary 435.

Instead, if the second user later requests the movie, the second user's experience may be much the same as that of the first user (e.g., and much the same as it would have been had the data not been stored in the client dictionary 435). For example, the second user may still visit the website using a web browser and may still log in with credentials. If authorized, the second user may still request an authorized, licensed copy of the movie file from the website, which may then be viewed in the embedded player surrounded by banner advertisements. However, as the data is received in response to the request, deltacasting techniques are used to fingerprint the data and identify the data as already being stored in the second user's client dictionary 435. The data may then be communicated to the second user accordingly, for example, by highly compressing the data according to a model of the client dictionary 435 stored at the server side of the communications system 500 (e.g., the client dictionary model 632).

As such, the use of deltacasting techniques may preserve legal and other obligations for content transactions. In the above example, the second user is unable to access copyright and/or unauthorized material from the client dictionary 435. Further, forcing the second user to access the content as intended by the content provider (e.g., through the provider's website) may allow the content provider to preserve advertising, hosting, and/or other relationships. For example, if the content provider happens to offer an advertisement that is already stored in the client dictionary, the advertisement may still be requested over the content network link 135 (e.g., thereby providing any associated advertisement tracking, revenue, etc.) while also being highly compressed over the client-server communications link 125.

It will now be appreciated that use of deltacasting techniques to identify and/or exploit multicasting opportunities provides certain features. However, using only the byte-level information may provide little or no content awareness. As such, according to various embodiments, deltacasting techniques are used to handle data blocks traversing the communications stem 500 according to their byte-level data (e.g., transparently and/or agnostically), and certain blocks are characterized as parts of content sets and handled accordingly to provide set-level awareness. For example, as described above, embodiments may implement a transparent optimizer that can perform set-level handling even with a dictionary of substantially unordered data blocks and with little or no knowledge of what content those blocks represent.

In one illustrative embodiment, a user requests a popular webpage, and the response includes blocks of data relating to a number of different types of content originating from a number of different content sources. The optimizer components (e.g., the server optimizer 130) treat each block effectively as a meaningless sequence of bytes, such that fingerprints are generated and some or all multicasting determinations are made with little or no consideration of what the byte sequence represents (e.g., its metadata, file type, etc.). For example, the optimizer components may function without determining whether the response data includes five or fifty separate objects; whether the objects are of certain types; whether the objects were retrieved from one or more content sources; whether cache busting, anonymizer, spoofing, and/or other techniques were used, whether there is any authentication requirement for accessing the data, etc. Even without this knowledge, however, if the popular webpage is determined to be a content set (e.g., as described above), the byte sequence can be handled as part of its respective content set.

The set-level handling may provide a number of different types of functionality. One type of functionality relates to identifying and exploiting content popularity and related metrics. Even without an object-level awareness of the content traversing the communications system 500 (e.g., without an awareness of which content objects are represented by the blocks of data stored at the client dictionaries, etc.), popularity and/or other metrics can be evaluated at the set level. For example, as discussed above, a list of popular webpages or feeds may be maintained, various statistics may be gathered, etc. The metrics may be used for many types of applications, including for web tracking (e.g., for reporting web traffic statistics), finding usage correlations between users, satisfying subscriptions (e.g., where users have subscribed to a particular feed), etc.

Another type of functionality relates to storage management. For example, a user may set preferences (e.g., or have preferences set by a service provider, have preferences dynamically adjusted according to usage or other factors, etc.) as to storage capacity designated for certain types of use. In one embodiment, a user selects a number of feeds and/or websites to be automatically updated by a pre-positioning client. Each feed or website may be associated with a bin (e.g., space within the user's client dictionary 435) having a designated capacity. Similarly, a service provider may set certain bins in the client dictionary 435 for pre-positioning certain types of data that is likely to be requested by users. For example, the first Megabyte of data for the top one-hundred movie downloads of the day may be anticipatorily multicast to all users and stored in a designated bin in their respective client dictionaries 435.

Still another type of functionality relates to using set-level awareness to maintain a high-level awareness of the contents of a client dictionary 435. In one embodiment, a browser plug-in may be provided that augments the user's web browsing experience according to high-level awareness of dictionary contents. For example, when a result of a web search points to a webpage stored as a content set in the client dictionary 435, the search result listing may indicate as such (e.g., the result may be displayed in a different color, highlighted or flagged, listed separately, priced differently, etc.). Similarly, other types of content interfaces (e.g., media players, feed readers, applets, etc.) may be configured to provide the user or any other entity with a set-level indication of client dictionary 435 contents.

In another embodiment, the set-level awareness is used to affect a relationship between the user and a service or content provider. For example, the user may contract with a service provider according to a Fair Access Policy (FAP), which designates resource usage policies for the user (e.g., the amount of download bandwidth a user is allowed over each 24-hour period). In one embodiment, users are encouraged to use locally stored data by providing a set-level indication of the client dictionary 435 contents and treating requests for the content as FAP-free or FAP-discounted (e.g., less bandwidth is used to satisfy the content set request, and the FAP hit for requesting the content is adjusted accordingly).

Yet another type of functionality relates to using set-level awareness to police content set determinations. In some cases, even where a content set is identified, it may be handled differently according to how the content set is sourced by content sources, used by users, etc. In one example, it is determined that each time a popular webpage is requested, over ninety-percent of the content set associated with the website is changed (e.g., the website shows the most popular movie download across the web at the time the request is made, such that the content set may significantly change for each subsequent request). The optimizer components may be unaware of which part of the content set is changing (e.g., because of a lack of object-level awareness), but the content set-level changes may nonetheless be determined to be so significant as to outweigh any efficiencies gained through further set-level handling. For example, in this and other cases, policing the content set may cause it to be removed from a list of pre-positioning sets, to not be indicated as available in the client dictionary 435, to not be offered as FAP-free or FAP-discounted, etc.

The above description is intended to provide various embodiments of the invention, but does not represent an exhaustive list of all embodiments. For example, those of skill in the art will appreciate that various modifications are available within the scope of the invention. Further, while the disclosure includes various sections and headings, the sections and headings are not intended to limit the scope of any embodiment of the invention. Rather, disclosure presented under one heading may inform disclosure presented under a different heading. For example, descriptions of embodiments of method steps for handling overlapping content requests may be used to inform embodiments of methods for handling anticipatory requests.

Specific details are given in the above description to provide a thorough understanding of the embodiments. However, it is understood that the embodiments may be practiced without these specific details. For example, well-known processes, algorithms, structures, and techniques may be shown without unnecessary detail in order to avoid obscuring the embodiments. Implementation of the techniques, blocks, steps, and means described above may be done in various ways. For example, these techniques, blocks, steps, and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field-programmable gate arrays (FPGAs), soft core processors, hard core processors, controllers, micro-controllers, microprocessors, other electronic units designed to perform the functions described above, and/or a combination thereof. Software can be used instead of or in addition to hardware to perform the techniques, blocks, steps and means.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. Similarly, terms like "cache" are intended to broadly include any type of storage, including temporary or persistent storage, queues (e.g., FIFO, LIFO, etc.), buffers (e.g., circular, etc.), etc. The term "machine-readable medium" includes, but is not limited to, portable or fixed storage devices, optical storage devices, wireless channels, and/or various other storage mediums capable of storing that contain or carry instruction(s) and/or data.

Further, certain portions of embodiments (e.g., method steps) are described as being implemented "as a function of" other portions of embodiments. This and similar phraseologies, as used herein, intend broadly to include any technique for determining one element partially or completely according to another element. For example, a method may include generating a fingerprint from a first request and generating a determination "as a function of" the fingerprint. In various embodiments, the determination may be made in any way, so long as the outcome of the determination generation step is at least partially dependant on the outcome of the fingerprint generation step.

While the principles of the disclosure have been described above in connection with specific apparatuses and methods, it is to be clearly understood that this description is made only by way of example and not as limitation on the scope of the disclosure.

What is claimed is:

1. A method for handling content multicast over a communications system having a communications path between a serverside of the communications system and a plurality of clients, the communications path comprising a shared forward link over which bandwidth resources are shared during a multicast communication, the method comprising:
    communicating a first request for a first content set of a plurality of content sets from a first client of the plurality of clients to the serverside at a first time instance, each content set of the plurality of content sets comprising a plurality of associated content objects, and each content set identified by a respective content set identifier including the first content set being identified by a first content set identifier that is associated with a set-level profile configured to characterize the first content set;
    receiving at a second time instance after the first time instance a data block at the first client from the server side, the receiving of the data block not being responsive to a request by the first client prior to the receiving the data block at the second time instance, the data block comprising a header portion and a content portion and having been multicast to the first client over the shared forward link as a result of the server side intercepting the data block in association with a second request by a second client for the data block after the first time instance, and as a result of the server side determining to multicast the data block according to a fingerprint generated using only byte-level information comprised by the content portion of the data block, the data block being associated at the server side of the communications system with an associated content set identifier of a corresponding one of the plurality of content sets;
    determining, at the first client after the receiving, whether to store the data block in a client dictionary according to whether the associated content set identifier associated with the received data block is the first content set identifier associated with the first requested first content set, wherein the wherein the determining comprises determining whether to store the data block according to at least a portion of the set-level profile; and
    when it is determined to store the data block in the client dictionary according to the associated content set identifier being the first content set identifier, storing the data block in the client dictionary in association with the first content set identifier, the first content set identifier being associated with the set-level profile configured to characterize the first content set.

2. The method of claim 1, further comprising:
    determining, at the first client when it is determined to store the data block in the client dictionary according to the first content set identifier, whether to remove stored data from the client dictionary according to a respective content set identifier.

3. The method of claim 1, further comprising:
    generating a dictionary profile configured to characterize contents of the client dictionary according to content set identifiers stored in association with contents of the client dictionary; and
    rendering web browser content at the first client according to the dictionary profile.

4. The method of claim 1, further comprising:
    calculating a compression gain metric for the requested content set as a function of content set identifiers stored in association with contents of the client dictionary.

5. The method of claim 1,
wherein the data block is received as part of downloading the plurality of content objects comprised by the first requested content set in response to the first request for the first content set.

6. The method of claim 1, wherein communicating a request comprises selecting a link through a web interface.

7. The method of claim 1, wherein the requested content set dynamically changes along with changes to the content objects comprised by the requested content set.

8. The method of claim 1, wherein the plurality of content objects associated with the requested content set is defined by contents of a content feed or a webpage.

9. The method of claim 1, wherein each content set is predetermined to be of interest to a respective set of clients.

10. A client system for handling content multicast over a communications system having a communications path between a serverside of the communications system and a plurality of clients, the client system being implemented in a first client of the plurality of clients, the communications path comprising a shared forward link over which bandwidth resources are shared during a multicast communication, the client system comprising:
a memory; a processor;
a machine-implemented optimizer module stored in the memory and executable by the processor to:
communicate to the server side a first request for a first content set of a plurality of content sets at a first time instance, each of the plurality of content sets comprising a plurality of associated content objects, each of the plurality of content sets being identified by a respective content set identifier including the first content set being identified by a first content set identifier that is associated with a set-level profile configured to characterize the first content set; and
receive a data block from the server side at a second time instance after the first time instance, the data block not being responsive to a request by the first client prior to the data block being received, the data block comprising a header portion and a content portion and having been received via a multicast over the shared forward link as a result of the serverside intercepting the data block in association with a second request by a second client for the data block after the first time instance, and as a result of the server side determining to multicast the data block according to a fingerprint generated using only byte-level information comprised by the content portion of the data block, the data block being associated at the serverside of the communications system with an associated content set identifier of a corresponding one of the plurality of content sets; and
a machine-implemented dictionary management module that is stored in the memory and executable by the processor and is communicatively coupled with the optimizer module and a client dictionary, to determine whether to store the data block in the client dictionary according to whether the associated content set identifier associated with the received data block is the first content set identifier associated with the first requested content set, wherein the dictionary management module operates to determine whether to store the data block in the client dictionary according to at least a portion of the set-level profile, and to store the data block in the client dictionary in association with the first content set identifier when it is determined to store the data block in the client dictionary according to the associated content set identifier being the first content set identifier, the first content set identifier being associated with the set-level profile configured to characterize the first content set.

11. The client system of claim 10, wherein the dictionary management module further operates to:
determine whether to remove stored data from the client dictionary according to a respective content set identifier when the dictionary management module determines to store the data block in the client dictionary.

12. The client system of claim 10, further comprising:
a web browser, communicatively coupled with the dictionary management module, that operates to:
render web browser content according to a dictionary profile configured to characterize contents of the client dictionary according to content set identifiers stored in association with contents of the client dictionary.

13. The client system of claim 10,
wherein the data block is received as part of downloading the plurality of content objects comprised by the first requested content set in response to the first request for the first content set.

14. The client system of claim 10, further comprising:
a compression management module, communicatively coupled with the client dictionary, and configured to:
calculate a compression gain metric for the requested content set as a function of content set identifiers stored in association with contents of the client dictionary.

15. The client system of claim 10, further comprising:
a web browser that operates to display links associated with the plurality of content sets via a graphical user interface,
wherein the optimizer module operates to communicate the request for the content set in response to the web browser receiving a selection of one of the links that is associated with the requested content set.

16. The client system of claim 10,
wherein the optimizer module, when executed, causes the processor to communicate the request for the content set; and
the dictionary management module, when executed, causes the processor to determine whether to store the data block in the client dictionary.

17. A method for handling content multicast over a communications system having a communications path between a server side of the communications system and a plurality of clients, the communications path comprising a shared forward link over which bandwidth resources are shared during a multicast communication, the method comprising:
communicating a first request for a first content set of a plurality of content sets from a first client of the plurality of clients to the serverside at a first time instance, each content set of the plurality of content sets comprising a plurality of associated content objects, and each content set identified by a respective content set identifier including the first content set being identified by a first content set identifier;
receiving at a second time instance after the first time instance a data block at the first client from the server side, the receiving of the data block not being responsive to a request by the first client prior to the receiving the data block at the second time instance, the data block comprising a header portion and a content portion and having been multicast to the first client over the shared forward link as a result of the server side intercepting the data block in association with a second request by a second client for the data block after the first time instance, and as a result of the serverside determining to multicast the data block according to a fingerprint generated using only byte-level information comprised by the content portion of the data block, the data block being associated at the server side of the communications system with an associated content set identifier of a corresponding one of the plurality of content sets; and determining, at the first client after the receiving, whether to store the data block in a client dictionary according to whether the associated content set identifier associated with the received data block is the first content set identifier associated with the first requested first content set; and calculating a compression gain metric for the requested content set as a function of content set identifiers stored in association with contents of the client dictionary.

* * * * *